(12) United States Patent
Lee et al.

(10) Patent No.: US 10,905,197 B2
(45) Date of Patent: Feb. 2, 2021

(54) MANUFACTURING METHOD FOR COATING A FABRIC WITH A THREE-DIMENSIONAL SHAPE

(71) Applicant: adidas AG, Herzogenaurach (DE)

(72) Inventors: Fu Wen Lee, Herzogenaurach (DE); Lulu Chen, Herzogenaurach (DE); Sam Forester, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 343 days.

(21) Appl. No.: 15/283,709

(22) Filed: Oct. 3, 2016

(65) Prior Publication Data
US 2017/0099908 A1 Apr. 13, 2017

(30) Foreign Application Priority Data

Oct. 9, 2015 (DE) .................... 10 2015 219 636

(51) Int. Cl.
*B29C 51/10* (2006.01)
*B29C 51/14* (2006.01)
(Continued)

(52) U.S. Cl.
CPC ............ *A43B 23/0275* (2013.01); *A43B 1/04* (2013.01); *A43B 23/0235* (2013.01);
(Continued)

(58) Field of Classification Search
CPC ....... B29C 51/10; B29C 51/12; B29C 51/145; B29C 51/36; B29C 51/421;
(Continued)

(56) References Cited

U.S. PATENT DOCUMENTS

| 2,069,083 A | 1/1937 | Adamson |
| 2,147,197 A | 2/1939 | Glidden |

(Continued)

FOREIGN PATENT DOCUMENTS

| CN | 102578759 | 7/2012 |
| DE | 602004005441 | 5/2007 |

(Continued)

OTHER PUBLICATIONS

"Nike Unveils Seamless, Thermo-Molded "Vac Tech" Sneakers", available at http://www.ecouterre.com/nike-unveils-seamless-thermo-molded-vac-tech-sneakers, Oct. 12, 2011, 12 pages.

(Continued)

*Primary Examiner* — Michael A Tolin
(74) *Attorney, Agent, or Firm* — Kilpatrick Townsend & Stockton LLP

(57) ABSTRACT

A method includes: (a.) providing a fabric comprising a first surface and a second surface; (b.) placing the fabric on a support structure adapted to permit gas circulation through at least a portion of a surface of the support structure, wherein the fabric is placed such that the first surface of the fabric faces the surface of the support structure and such that the fabric is arranged at least in part over a raised or embossed portion of the support structure; (c.) providing at least one coating comprising a first coating surface and a second coating surface opposite the first coating surface; (d.) placing the coating at least partially on the second surface of the fabric, such that the first coating surface faces the fabric; and (e.) applying a gas pressure differential between the second coating surface and the first surface of the fabric.

20 Claims, 12 Drawing Sheets

(51) Int. Cl.
| | |
|---|---|
| B29C 51/42 | (2006.01) |
| B29D 35/00 | (2010.01) |
| B29D 35/14 | (2010.01) |
| B29L 31/50 | (2006.01) |
| A43B 23/02 | (2006.01) |
| A43C 11/00 | (2006.01) |
| A43D 3/02 | (2006.01) |
| A43B 1/04 | (2006.01) |

(52) U.S. Cl.
CPC ........ *A43B 23/0255* (2013.01); *A43C 11/002* (2013.01); *A43C 11/006* (2013.01); *A43D 3/02* (2013.01); *B29D 35/0063* (2013.01); *B29D 35/0072* (2013.01); *B29D 35/146* (2013.01); *B29C 51/10* (2013.01); *B29C 51/145* (2013.01); *B29C 51/421* (2013.01); *B29C 2791/006* (2013.01); *B29L 2031/505* (2013.01)

(58) Field of Classification Search
CPC ....... B29C 2791/006; A43B 5/00; A43B 5/02; A43B 9/00; A43B 23/0235; A43B 23/0255; A43B 23/026; A43B 23/0275; A43C 11/002; A43C 11/006; A43D 3/02; A43D 9/00; B29D 35/0063; B29D 35/0072; B29D 35/126; B29D 35/128; B29D 35/146; B29D 35/148; B29L 2031/505
See application file for complete search history.

(56) References Cited

U.S. PATENT DOCUMENTS

| | | | |
|---|---|---|---|
| 2,582,298 | A | 1/1952 | Ushakoff et al. |
| 3,007,262 | A | 11/1961 | Richards |
| 3,231,454 | A | 1/1966 | Williams |
| 3,720,971 | A | 3/1973 | Kearney et al. |
| 3,769,723 | A | 11/1973 | Masterson et al. |
| 3,931,685 | A | 1/1976 | Laukaitis |
| 4,120,101 | A | 10/1978 | Drew |
| 4,356,642 | A | 11/1982 | Herman |
| 4,681,648 | A | 7/1987 | Maeda |
| 4,811,497 | A | 3/1989 | Merino |
| 4,893,418 | A | 1/1990 | Ogden |
| 5,275,775 | A | 1/1994 | Riecken |
| 5,358,394 | A | 10/1994 | Riecken |
| 5,392,534 | A | 2/1995 | Grim |
| 5,404,659 | A | 4/1995 | Burke et al. |
| 5,529,826 | A | 6/1996 | Tailor et al. |
| 5,555,650 | A | 9/1996 | Peel et al. |
| 5,617,650 | A | 4/1997 | Grim |
| 5,797,200 | A | 8/1998 | Hess et al. |
| 5,879,614 | A * | 3/1999 | Harrison ................ B32B 27/12 264/510 |
| 5,940,991 | A | 8/1999 | Cabalquinto |
| 5,976,451 | A | 11/1999 | Skaja et al. |
| 5,987,778 | A | 11/1999 | Stoner |
| 6,299,962 | B1 | 10/2001 | Davis et al. |
| 6,533,885 | B2 | 3/2003 | Davis et al. |
| 6,558,784 | B1 | 5/2003 | Norton et al. |
| 6,670,029 | B2 | 12/2003 | Norton et al. |
| 7,080,467 | B2 | 7/2006 | Marvin et al. |
| 7,178,267 | B2 | 2/2007 | Skaja et al. |
| 7,350,321 | B2 | 4/2008 | Soon et al. |
| 7,464,489 | B2 | 12/2008 | Ho |
| 8,109,014 | B2 | 2/2012 | Miller et al. |
| 8,266,749 | B2 | 9/2012 | Dua et al. |
| 8,372,234 | B2 | 2/2013 | Loveder |
| 8,424,221 | B2 | 4/2013 | Litchfield et al. |
| 2002/0012784 | A1 | 1/2002 | Norton et al. |
| 2002/0078591 | A1 | 6/2002 | Morrone |
| 2003/0221336 | A1 * | 12/2003 | Krstic ................ A43B 3/0042 36/93 |
| 2005/0126038 | A1 | 6/2005 | Skaja et al. |
| 2006/0042125 | A1 * | 3/2006 | Chen ................... A43B 1/0072 36/77 R |
| 2007/0022627 | A1 | 2/2007 | Sokolowski et al. |
| 2007/0056189 | A1 | 3/2007 | Schafer et al. |
| 2008/0196278 | A1 | 8/2008 | Zanatta et al. |
| 2009/0025253 | A1 | 1/2009 | Harper et al. |
| 2012/0180340 | A1 | 7/2012 | Crowley, II et al. |
| 2012/0211928 | A1 | 8/2012 | Takai et al. |
| 2012/0297643 | A1 | 11/2012 | Shaffer et al. |
| 2013/0014900 | A1 | 1/2013 | Hull et al. |
| 2013/0042501 | A1 | 2/2013 | Velazquez et al. |
| 2013/0131854 | A1 | 5/2013 | Regan et al. |
| 2013/0152423 | A1 | 6/2013 | Wu |
| 2014/0237738 | A1 | 8/2014 | Johnson et al. |
| 2014/0237853 | A1 | 8/2014 | Fisher et al. |
| 2014/0239556 | A1 | 8/2014 | Fisher et al. |
| 2015/0101133 | A1 | 4/2015 | Manz et al. |
| 2015/0101134 | A1 | 4/2015 | Manz et al. |
| 2015/0223552 | A1 | 8/2015 | Love et al. |
| 2015/0305448 | A1 | 10/2015 | Cavaliere et al. |
| 2016/0136869 | A1 | 5/2016 | Iovu |

FOREIGN PATENT DOCUMENTS

| | | |
|---|---|---|
| DE | 102011100642 | 11/2012 |
| EP | 0930962 | 6/2003 |
| EP | 1621089 | 2/2006 |
| EP | 2316292 | 7/2014 |
| EP | 2881236 | 6/2015 |
| EP | 2904920 | 8/2015 |
| EP | 3266329 | 1/2018 |
| GB | 1442343 | 7/1976 |
| JP | 422125 | 2/1967 |
| JP | 45-10357 | 5/1970 |
| JP | H07-40486 | 2/1995 |
| JP | 3052665 | 7/1998 |
| JP | 2009219786 | 10/2009 |
| JP | 2011092724 | 5/2011 |
| JP | 5075391 | 11/2012 |
| JP | 2014210179 | 11/2014 |
| WO | 0036943 | 6/2000 |
| WO | 2013123922 | 8/2013 |
| WO | 2014070018 | 5/2014 |
| WO | 2014130319 | 8/2014 |
| WO | 2015167645 | 11/2015 |

OTHER PUBLICATIONS

"Nike Vac Tech Premium Wheat Pack", http://www.kicksonfire.com/tag/nike-vac-tech-premium-wheat-pack (known to Applicant no later than Oct. 16, 2013).

"Nike's New Thermo-Molded Sneakers Are Like Sculptures for Your Feet _ Co.Design _ business + design", available at http://www.fastcodedesign.com/1665178/nike-s-new-thermo-molded-sneakers-are-like-sculptures-for-your-feet (known to Applicant no later than Oct. 16, 2013), 3 pages.

Unpublished U.S. Appl. No. 14/165,468, filed Jan. 27, 2014.

Unpublished U.S. Appl. No. 14/165,499, filed Jan. 27, 2014.

Unpublished U.S. Appl. No. 14/246,740, filed Apr. 7, 2014.

Unpublished U.S. Appl. No. 15/283,611, filed Oct. 3, 2016.

German Patent Application No. 102015219636.4, Office Action dated Jul. 6, 2016, 9 pages (No English translation available. A summary of the Office Action is provided in the Transmittal Letter submitted herewith).

German Application No. 102015219636.4, Office Action dated Nov. 13, 2017, 9 pages (4 pages of English translation and 5 pages of original document.

European Application No. EP16192792.6, Extended European Search Report dated Feb. 7, 2017, 8 pages.

Chinese Patent Application No. 201610881696.2, Office Action dated May 28, 2018, 21 pages (machine English translation provided).

Chinese Patent Application No. 201610881962.1, Office Action dated Feb. 22, 2019, 25 pages (English translation provided).

Japanese Patent Application No. 2016-198713, Office Action dated May 7, 2019, 18 pages (English translation provided).

(56) References Cited

OTHER PUBLICATIONS

European Patent Application No. 16192792.6, Office Action dated Nov. 6, 2019, 4 pages.

\* cited by examiner

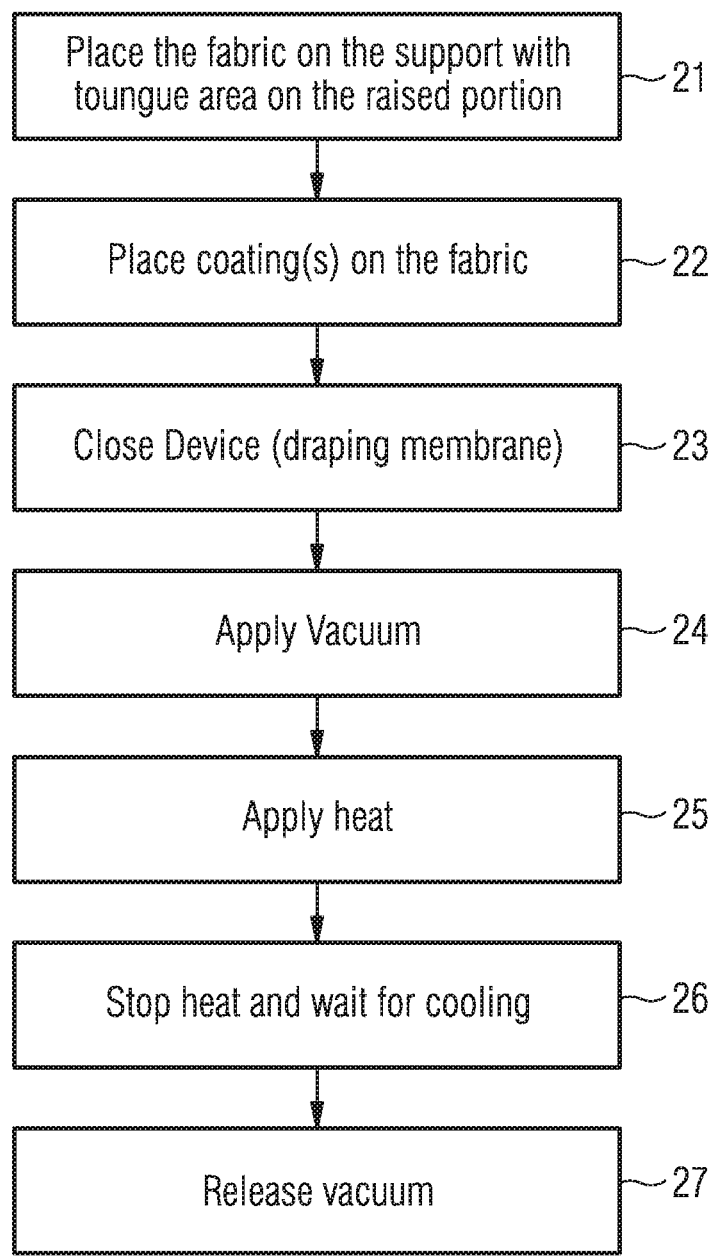

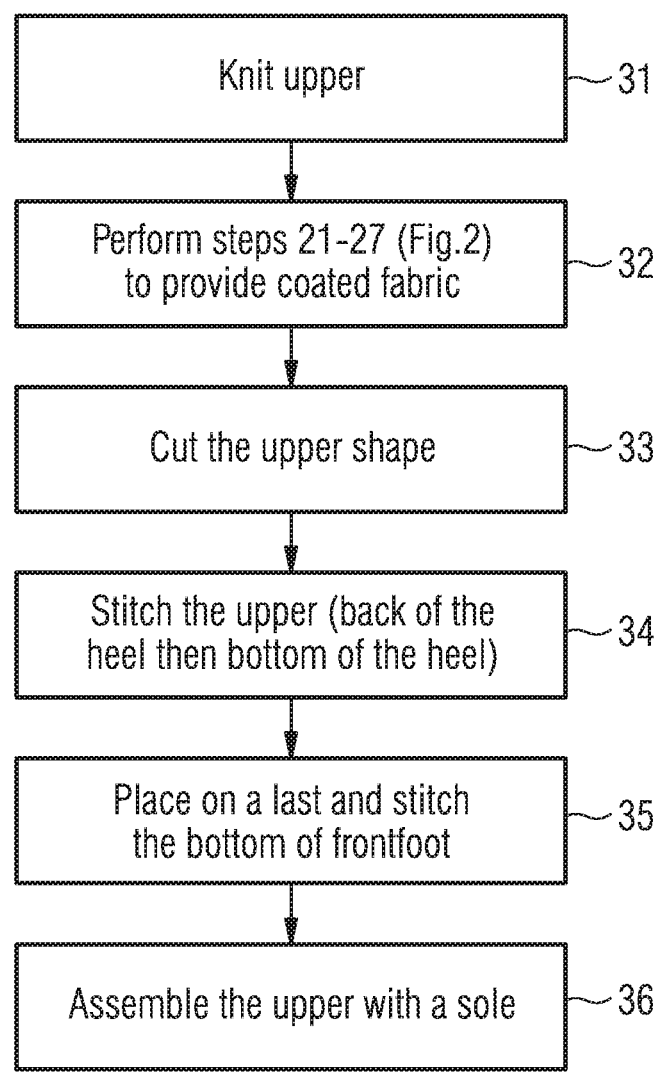

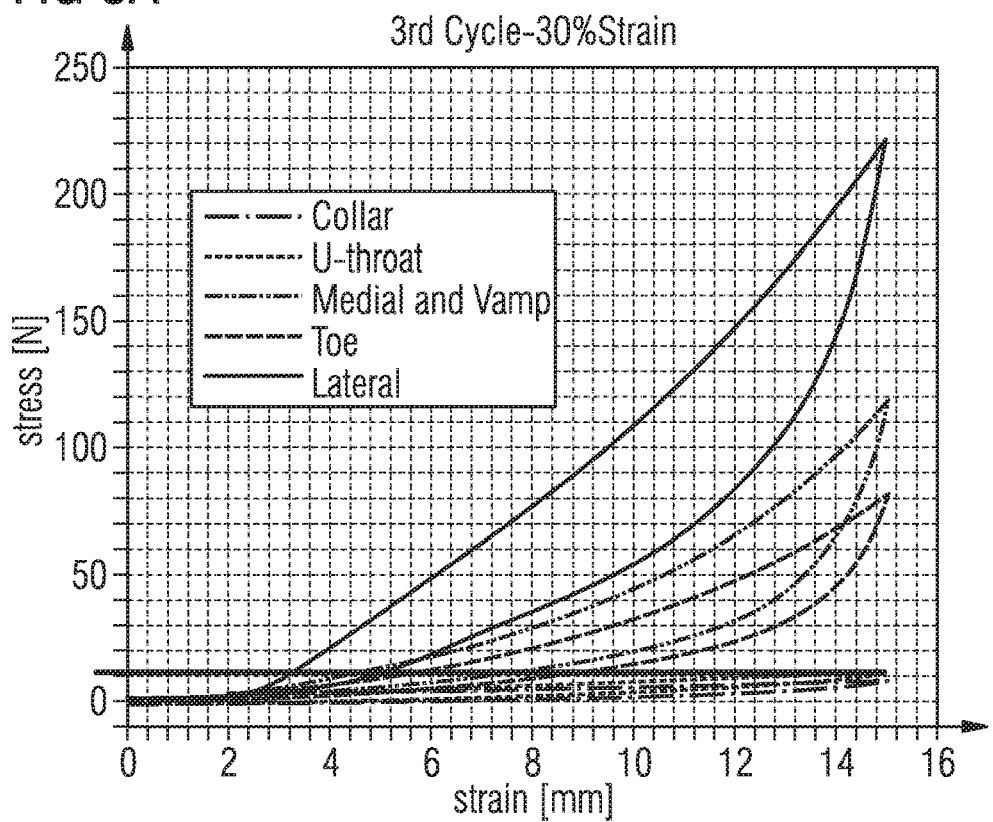
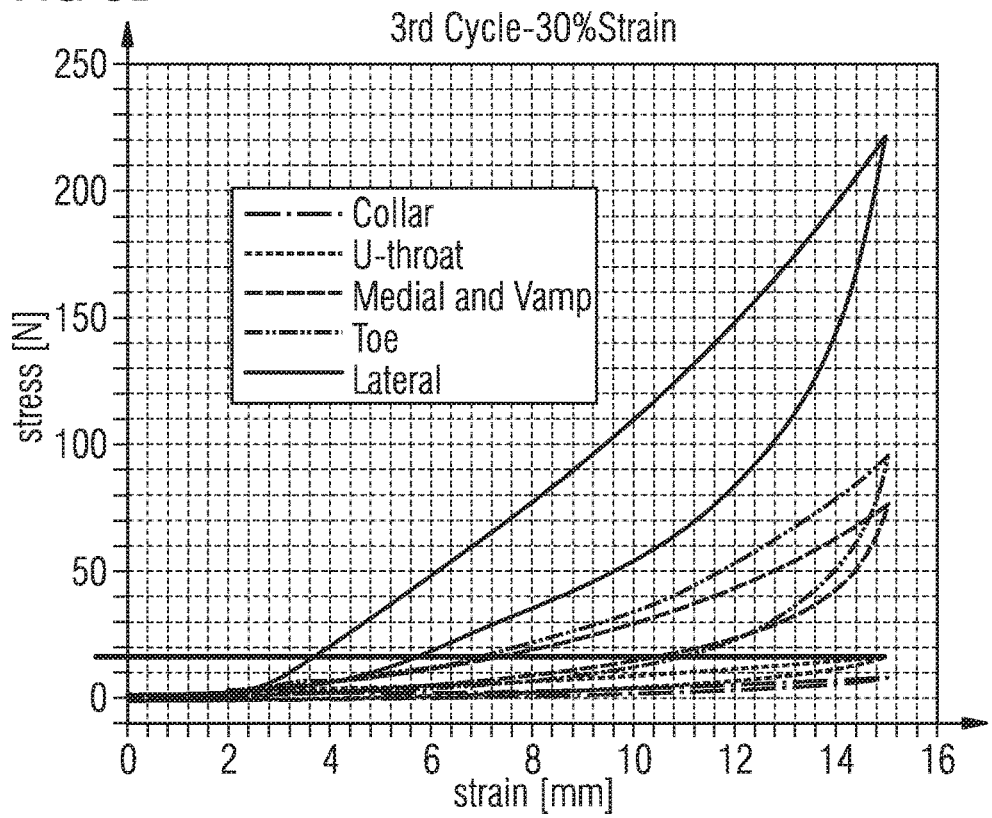

MANUFACTURING METHOD FOR COATING A FABRIC WITH A THREE-DIMENSIONAL SHAPE

CROSS REFERENCE TO RELATED APPLICATION

This application is related to and claims priority benefits from German Patent Application No. DE 10 2015 219 636.4, filed on 9 Oct. 2015, entitled "Manufacturing method for coating a fabric with a three-dimensional shape" ("the '636 application"). The '636 application is hereby incorporated herein in its entirety by this reference.

FIELD OF THE INVENTION

The present invention relates to a method of manufacturing an article comprising a fabric, to an article comprising a fabric, and to a device for manufacturing an article comprising a fabric.

BACKGROUND

Articles comprising fabric such as shoes, pieces of apparel or wearable accessories normally have a three-dimensional shape. Furthermore, the fabric is often coated with a coating to reduce the stretch of the fabric, increase its abrasion resistance, water repellency, surface friction and/or durability, etc.

The coating is often applied to the fabric while the fabric is in a two-dimensional, flat shape. For example, the coating may be applied as a film under heat and pressure to the fabric.

However, a fabric obtained in this way does not always fit the three-dimensional shape of the article. Therefore, further steps are required such as cutting and stitching, for example, in order to make the fabric fit the article shape. Also such operations on the fabric with the coating applied may cause buckling and even small cracks in the coating. Furthermore, the three-dimensional shape obtained may not have the desired stability as the coating creates restoring forces which try to return the coated fabric to the two-dimensional shape in which the coating was applied. Besides, in some cases, creases may be made on certain fabrics during such operation, or the coating may not be in the right position with respect to the final article.

US 20130014900 A1 discloses a method of applying graphics to a set of articles with a graphic transfer assembly. The method includes a step of selecting an article from a set of articles comprising different types of articles. After selecting a last that may be associated with the article, the last may be attached to a last assembly of the graphic transfer assembly. With the article attached to the graphic transfer assembly, a deformable membrane may apply graphics to curved portions of the article.

However, with this method it is rather difficult to control the correct placement of the graphic relative to the article. Furthermore, the bonding obtained between the surface of the article and the graphic is not very good.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method of manufacturing an article comprising a fabric may be provided. The method can include providing a fabric comprising a first surface and a second surface opposite the first surface. The method can also include placing the fabric on a surface of a support structure. The support structure can be adapted to permit gas circulation through at least a portion of the surface of the support structure. The support structure can include at least a raised or embossed portion on the surface of the support structure. The fabric can be placed such that the first surface of the fabric faces the surface of the support structure and such that the fabric is arranged at least in part over the raised or embossed portion of the support structure. The method can also include providing at least one coating comprising a first coating surface and a second coating surface opposite the first coating surface. The method can also include placing the coating at least partially on the second surface of the fabric, such that the first coating surface faces the fabric. The method can also include applying a gas pressure differential between the second coating surface and the first surface of the fabric.

In some embodiments, the article may be a shoe upper for a shoe, or the shoe comprising the shoe upper. The fabric may be a knitted fabric.

In some embodiments, the method can also include placing a draping membrane on the fabric and the coating before the pressure differential is applied.

In some embodiments, the method can also include heating the coating. Heating the coating may be performed at least partly simultaneously with applying the gas pressure differential.

The coating may include a film that has a thickness between 0.02 mm and 3 mm.

The coating may include a thermoplastic coating.

The coating may include a polymer with a hardness in the range of 40-80 Shore A.

In some embodiments, providing at least one coating may include providing a plurality of coatings, and placing the coating may include placing the plurality of coatings.

In some embodiments, the raised or embossed portion of the support structure corresponds to an ankle portion and a top portion of a dorsal part of a last.

In some embodiments, the support structure has the shape of a shoe last.

According to certain embodiments of the present invention, an article includes a fabric that may include a first surface and a second surface opposite the first surface. The article can also include a coating comprising a first coating surface and a second coating surface opposite the first coating surface. The coating may be applied to the fabric by a process including at least placing the fabric on a surface of a support structure. The support structure may be adapted to permit gas circulation through at least a portion of the surface of the support structure. The support structure may include at least a raised or embossed portion on the surface of the support structure. The fabric may be placed such that the first surface of the fabric faces the surface of the support structure and such that the fabric is arranged at least in part over the raised or embossed portion of the support structure. The process can further include placing the coating at least partially on the second surface of the fabric, such that the first coating surface faces the fabric. The process can further include applying a gas pressure differential between the second coating surface and the first surface of the fabric.

In some embodiments, the fabric has a three-dimensional shape.

In some embodiments, the article is a shoe in which the fabric forms at least a part of a shoe upper of the shoe. The article may be the shoe upper for the shoe.

In some embodiments, the shoe upper is knitted in one piece, is laceless, and includes (a.) a lateral portion; (b.) a medial portion; and (c.) an elastic intermediate portion between the lateral portion and the medial portion. At least one of a stiffness of the lateral portion and/or a stiffness of the medial portion may be at least 2 times higher than a stiffness of the elastic intermediate portion.

In some embodiments, the stiffness of the medial portion may be between 2 and 30 times higher than the stiffness of the intermediate portion, the stiffness of the lateral portion may be between 3 and 50 times higher than the stiffness of the intermediate portion, and/or the shoe upper may include at least one forefoot portion with a stiffness at least equal to the stiffness of the medial portion.

In some embodiments, the article includes at least one of a piece of apparel or a wearable accessory.

According to certain embodiments of the present invention, provided may be a device for manufacturing an article including a fabric. The device can include a support structure. The support structure can be adapted to permit gas circulation through at least a portion of a surface of the support structure. The support structure may include at least a raised or embossed portion on the surface of the support structure. The support structure can be adapted to hold a fabric and a coating such that at least a portion of the fabric is arranged over the raised or embossed portion. The device can also include a vacuum source connected to the support structure and adapted for applying a gas pressure differential between two opposite faces of the fabric placed on the surface of the support structure.

In some embodiments, the device also includes a draping membrane adapted to be placed on the fabric and the coating.

BRIEF DESCRIPTION OF THE DRAWINGS

In the following detailed description, embodiments of the invention are described referring to the following figures:

FIG. 2 is a flow chart of a method for manufacturing an article comprising a fabric, according to certain embodiments of the present invention.

FIG. 3 is a flow chart of a method of manufacturing a shoe, according to certain embodiments of the present invention.

FIGS. 8A and 8B illustrate stress-strain-diagrams obtained by measuring on shoe parts of a shoe, according to certain embodiments of the present invention.

BRIEF DESCRIPTION

Figure 1A:
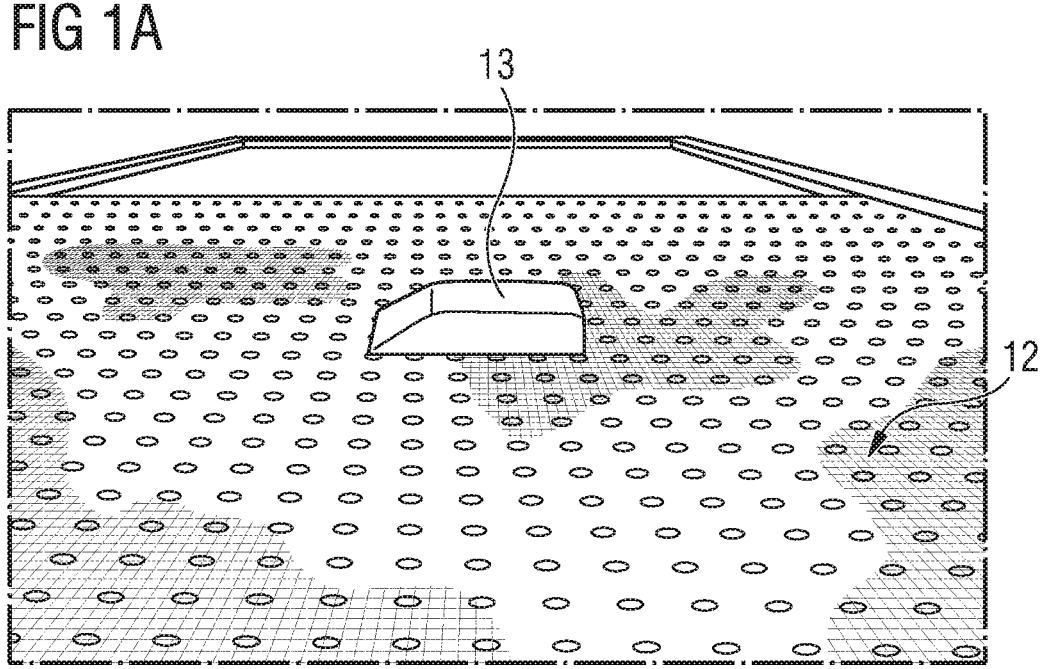
FIGS. 1A, 1B, 1C, 1D, and 1E illustrate a method, according to certain embodiments of the present invention.

Therefore, it is an objective of the present invention to overcome the disadvantages of the prior art. In particular, an object of the present invention is to provide a method of manufacturing an article comprising a fabric and a coating applied thereon which provides for a very good bonding between the coating and the fabric and which allows for a precise placement of the coating.

This objective is met by a method of manufacturing an article comprising a fabric, wherein the method comprises at least the steps of: (a.) providing a fabric comprising a first surface and a second surface opposite the first surface; (b.) placing the fabric on a surface of a support structure, wherein the support structure is adapted to permit gas circulation through at least a portion of its surface and comprises at least a raised or embossed portion on its surface, and wherein the fabric is placed such that the first surface of the fabric faces the surface of the support structure and such that the fabric is arranged at least in part over the raised or embossed portion of the support structure; (c.) providing at least one coating comprising a first surface and a second surface opposite the first surface; (d.) placing the coating at least partially on the second surface of the fabric, such that the first surface of the coating faces the fabric; and (e.) applying a gas pressure differential between the second surface of the coating and the first surface of the fabric.

Thus, according to such method operations, a fabric is placed at least in part over a raised or embossed portion of a support structure. According to method step (d.) the coating is placed over the fabric and the fabric is placed at least in part over the raised or embossed portion of the support structure. The support structure is adapted to permit gas circulation through at least a portion of its surface. Thus, a gas pressure differential may be applied between the upper surface of the coating and the lower surface of the fabric.

To this effect, the fabric is placed on top of at least one of a plurality of holes in the surface of the support structure, in particular beneficially on top of a plurality of holes in the surface of the support structure, said holes being connected pneumatically to at least one vacuum pump.

The method according to the invention achieves a very good bonding between the coating and the fabric due to the pressure differential. Thus, the coating is not simply pressed against the fabric, but it is additionally sucked into the fabric. The bonding obtained is therefore better as the coating may at least partially penetrate between the fabric's fibers. When the coating is applied to protect the fibers of the fabric, e.g. against water, this also permits to obtain a better protection of the fibers. This is in particular beneficial with thin-film coatings or liquid coatings. For example, a liquid coating may be sprayed on the fabric and may be sucked at least partially through the fabric, where it may dry. Also, when the fabric is not flat, for example some fabric may have a specific surface texturing with relief, the method according some embodiments permits a coating to be obtained which conforms to the surface texturing of the fabric.

In some embodiments, the fabric may be breathable in the sense that it allows the passage of gas, at least when a pressure differential is applied across the thickness of the fabric.

According to some embodiments, the article may be a shoe upper for a shoe, or the article may be a shoe. The fabrics of shoe uppers and shoes are often coated to impart certain properties such as limiting stretch, abrasion resistance, support, stiffness, water repellency, etc. Furthermore, shoe uppers and shoes have a three-dimensional shape, such that applying a coating according to embodiments while the shoe or shoe upper is conformed to a three-dimensional shape is highly beneficial.

In general, embodiments may be applied to all sorts of articles, be it end products (such as shoes, apparel, accessories, etc.), intermediate products (such as shoe uppers) or preliminary products (such as fabrics, textile components, etc.).

The fabric may be a knitted fabric. The usage of knitted fabric is beneficial in the context of the present invention as it permits a good passage of gas due to its open mesh structure.

By applying the pressure differential, the coating is bonded to the mesh structure of the fabric.

Due to the three-dimensional shape of the raised or embossed portion of the support structure, the fabric conforms to a three-dimensional shape, that is to say, the fabric is not flat anymore, but rather forms a surface which extends in three dimensions.

The objective mentioned above is furthermore met by an alternative method of manufacturing an article comprising a fabric, wherein the method comprises at least the steps of: providing a fabric comprising a first surface and a second surface opposite the first surface; placing the fabric on a surface of a support structure, wherein the support structure is adapted to permit gas circulation through at least a portion of its surface and comprises at least a raised or embossed portion on its surface, and wherein the fabric is placed such that the first surface of the fabric faces the surface of the support structure and such that the fabric is arranged at least in part over the raised or embossed portion of the support structure; providing at least one coating comprising a first surface and a second surface opposite the first surface; placing the coating at least partially on the second surface of the fabric, such that the first surface of the coating faces the fabric and applying a gas pressure differential between the second surface of the coating and the first surface of the fabric; or placing the coating at least partially on the first surface of the fabric, such that the second surface of the coating faces the fabric; and applying a gas pressure differential between the second surface of the fabric and the first surface of the coating.

In some embodiments, the gas may be ambient air or it may be an essentially pure gas such as helium, oxygen or nitrogen, or it may be another mix of gases.

The pressure differential may cause a lower pressure at the surface of the support structure than at the second surface of the coating. In this way, the coating being on top of the fabric, it is sucked towards the fabric and firmly bonded thereto.

The method may further comprise the step of placing a draping membrane on the fabric and the coating before the pressure differential is applied. The draping membrane may additionally apply pressure to the coating and the fabric to improve the bonding. Furthermore, the draping membrane may help to maintain the coating on the fabric before bonding.

The draping membrane may beneficially be at least partially gas-proof to the gas under which the pressure differential is applied. Thus, the draping membrane may be firmly pressed onto the coating and the fabric when the gas pressure differential is applied, and may exert an additional pressure to increase the bonding. If air is used, the draping membrane may be at least partially airproof, that is sufficiently airproof to be sucked on the support structure when the gas pressure differential is applied through the surface of the support structure.

The coating may be heated. Heat may further improve the bonding between the coating and the fabric. Heat may be applied in different ways. For example, the support structure (e.g. its surface) may be heated, whereby heat is transferred to the fabric and the coating. Heat may be applied directly to the coating, e.g. by infrared light. If used, heat may be applied through the draping membrane. For example, the draping membrane may be transparent to infrared light or microwaves.

The step of heating the coating may be performed at least partly simultaneously with the step of applying a gas pressure differential. Thus, heat is applied while the coating is in firm contact with the fabric which leads to a very good bonding between the coating and the fabric.

The coating may be a waterproofing coating. Alternatively or in combination, the coating may be a drag-lowering coating. This may be achieved either by the material of the coating and/or by its surface texturing. Such a coating may be decorative or may be associated with a decorative coating. The coating may also improve resistance to abrasion, strain and/or wear. Alternatively or additionally, the coating may add strength, rigidity and/or elasticity to the fabric. Furthermore, the coating may improve the grip provided by the fabric. This is in particular beneficial if the fabric is used in a shoe upper, such as e.g. for a soccer shoe.

The coating may in particular be suited to ensure the function of maintaining the three-dimensional shape of the fabric once it is taken from the support structure after the method has been performed according to some embodiments. To this end, the coating may in some embodiments be at least partially placed over the raised or embossed portion of the support structure. In this way, the coating conforms to the shape of the raised or embossed portion at least in part and causes the fabric to maintain that shape as well once the coating is cured.

The coating may be a thermoplastic coating. Thermoplastic coatings are applied to the fabric by heat transfer and achieve a very good bonding to the fabric. Also, in case of a fabric with openings (such as those formed by meshes of a e.g. a knitted fabric), a thermoplastic coating (e.g. which may be relatively thin) may melt and penetrate the yarns, but preserve the openings and air permeability of the fabric.

The coating may be a film. A film may be exactly placed on the fabric either by hand or by an automatic feeder (e.g. a robot arm). Thus, using a film coating with the method of certain embodiments achieves a very precise positioning of the coating on the fabric.

The coating may comprise a surface structure before being placed on the fabric. For example, the coating may comprise a small embossing and/or debossing. The surface structure may have the shape of dots, pyramids or lines. A surface structure may beneficially increase the grip, for example of a shoe upper on a ball.

The coating may have a thickness between 0.02 mm and 3 mm. In particular, the thickness may be between 0.1 mm and 1.5 m and more beneficially between 0.2 mm and 1 mm, for example 0.3 mm.

The coating may be a polymer material with a hardness in the range of 40-80 Shore A, and in some embodiments with a hardness in the range of 50-70 Shore A, and in some embodiments with a hardness of 60 Shore A.

The coating may be a thermoplastic. In particular the coating may be a polyurethane. Alternatively or in combination, the coating may comprise a plurality of layers, such as e.g. a layer of a thermoset chosen for the functionality it brings to the fabric, and a layer of a thermoplastic chosen for its ability to bond with the fabric under pressure differential and heat application.

The step of providing at least one coating may comprise providing a plurality of coatings and the steps of placing the at least one coating may comprise placing the plurality of coatings. The coatings of the plurality of coatings may be of the same or different shape. For example, a first coating may have a mirror-inverted shape of a second coating, where the first coating is applied to a right side of the article, whereas the second coating is applied to the left side of the article (e.g. left and right side of a shoe, left and right shoulder of a T-shirt, etc.).

The coatings of the plurality of coatings may be of the same or of a different material, may have the same or a different thickness, and may have the same or different colors. The coatings of the plurality of coatings may coincide, overlap, or be separated from each other. Furthermore, it is possible that at least one coating is placed above the fabric according to method step (d.) and at least one further coating is placed under the fabric. Thus, the fabric may be coated from both sides according to the method of certain embodiments.

The raised or embossed portion of the support structure may correspond to the ankle portion and the top portion of the dorsal part of a last. Thus, if the article in which the fabric will be integrated is a shoe or shoe upper, a portion of the shoe or shoe upper may be formed to a three-dimensional shape by the method according to certain embodiments. Thus, the problems mentioned above with forming a two-dimensional coated fabric into a three-dimensional shape are avoided.

If the support structure comprises a raised portion, the raised portion may correspond to a top portion of a dorsal part of a last. In this case, the support structure may be flat around the raised portion. This provides for easier manufacturing and better accuracy when positioning elements on the support structure.

However, the raised or embossed portion of the support structure may correspond to a portion of a last but may also have some differences with the corresponding portion of the last used in a later step of assembling and shaping the shoe.

In case of a raised portion, the raised portion may correspond to at least a part of the instep portion of a last. The size and/or shape of the raised portion may be varied to form shoe uppers with different sizes and/or shapes. This may help to better fit the shoe uppers to the different feet of wearers of the shoes. In particular, the raised portion may be customized to the foot of a wearer. The customization may be based on foot data e.g. obtained by 3-D scanning.

The support structure may have the shape of a shoe last. Thus, a shoe upper comprising a fabric may be exactly formed to the shape of the last when coating the fabric. The coating then conforms to the actual shape of the last, and at least partially maintains the fabric to the shape of the last after it is released from the support structure. In such case, the last may comprises at least one hole—and in some embodiments, a plurality of holes—on its surface which are connected pneumatically to at least one low pressure source. To this effect, at least one air channel may be formed inside the last.

A further aspect relates to an article comprising a fabric obtained by a method as described herein and in particular as described above.

The fabric may have a three-dimensional shape. Thus, the three-dimensional fabric obtained by the method described herein adds to the three-dimensional shape of the article. It is even possible that the entire three-dimensional article is made from a three-dimensional fabric coated according to the method.

The article may be a shoe in which the fabric forms at least a part of the shoe upper, or a shoe upper for a shoe. The shoe may be a laceless shoe. Embodiments may be in particular beneficial for manufacturing a laceless shoe upper, because such a shoe upper may lack a cut in the U-throat and would be deformed (e.g., in particular flattened and/or folded) by conventional coating techniques using pressure and heat. The U-throat of a laceless shoe upper corresponds to the tongue of a conventional shoe upper with laces, i.e. it is a portion which is located over the instep of the foot.

The shoe upper may be knitted in one piece. Thus, a lightweight, yet stable shoe upper may be obtained. If the fabric is knitted as well, the knitted fabric may be an integral part of the knitted shoe upper.

The shoe upper may be laceless and comprise: (a.) a lateral portion; (b.) a medial portion; and (c.) at least an elastic intermediate portion between the lateral portion and the medial portion, wherein the stiffness of at least one of the lateral portion or the medial portion is at least two times higher than the stiffness of the elastic intermediate portion.

In some embodiments, a laceless shoe upper is a shoe upper without any laces for tightening the shoe. Moreover a shoe upper and a shoe in some embodiments may be devoid of attachment means. A shoe upper in some embodiments does not comprises attachment means having an open position and a closed position. Therefore the shoe upper in some embodiments does not comprise any attachment means such as laces, cables, hook-and-loop fasteners, straps, velcros, etc.

The intermediate portion of the shoe upper is understood as covering at least the U-throat of the shoe upper. The U-throat of a laceless shoe upper corresponds to the tongue of a conventional shoe upper with laces, i.e. it is a portion which is located over the instep of the foot and made to deform so as to permit introduction of the foot in the shoe and extraction of the foot out of the shoe.

The stiffness in this application is referred to as a ratio of the load (e.g. a force) applied to a piece of material over the deformation (e.g. a change in length) of this material. Measurements have been made using samples cut out of shoes, the samples being 20 mm large and 50 mm long from clamp to clamp. A strain has been applied by the clamps from 0% to 30% elongation of the original sample length and then released so the material may come back to its original length of 50 mm. The measurements of the third cycle of strain application have been used. In general, measurements with an elongation of more than 5% lead to accurate results.

A laceless shoe upper comprising a lateral portion and a medial portion having a stiffness at least two times higher than the stiffness of an elastic intermediate portion provides for a shoe which provides sufficient support to a foot of a wearer, while at the same time allows the wearer to easily put on and take off the shoe. The necessary support to the foot is provided by the lateral portion and the medial portion having a significant higher stiffness than the intermediate portion, thereby limiting the strain of the lateral and medial portions such that the foot is firmly held in place even during cutting movements. On the other hand, the elastic intermediate portion having a stiffness of at least two times lower than the lateral and medial portion allows for the necessary widening of the shoe, such that the shoe can comfortably be put on and off.

The intermediate portion in the context of the present invention may for example be a dorsal portion of the shoe upper.

The elastic intermediate portion may be placed at least in part over the raised or embossed portion of the support structure.

The lateral portion may be adapted to extend from a lateral junction of the upper with the sole to the elastic intermediate portion. In this way, the stability of the upper may be increased as the comparably stiff and inelastic lateral portion may be directly joined to the sole (e.g. by gluing, stitching or welding) and extends up to the elastic intermediate portion, thus covering the lateral side essentially over all of its height. This improves support of the foot, in particular during athletic activities, and most particularly during cutting movements.

The medial portion may be adapted to extend from a medial junction of the upper with the sole to the elastic intermediate portion. In this way, the stability of the upper may be increased as the comparably stiff and inelastic medial portion may be directly joined to the sole (e.g. by gluing, stitching or welding) and extends up to the elastic intermediate portion, thus covering the medial side essentially over all of its height. This improves support of the foot, in particular during athletic activities, and most particularly during cutting movements.

The shoe upper may comprise a unique elastic intermediate portion between the lateral portion and the medial portion. Furthermore, the elastic intermediate portion of the shoe upper may comprise a single, one-piece elastic material. Thus, the elastic intermediate portion may be designed with a smooth surface. This is in particular beneficial with some athletic shoes, e.g. a soccer or rugby shoe in order to provide for good ball control.

The elastic intermediate portion may extend at least partly on a dorsal portion. Furthermore, the shoe upper may be adapted so that the intermediate portion extends on the dorsal portion of a foot when the upper is integrated in a shoe. This provides for a better fit as the instep of the foot varies from person to person, and having the elastic portion between lateral and medial portion allows the shoe upper to adapt to the shape and size of the foot.

At least a part of the center line of the elastic intermediate portion may extend in the medial half of the shoe upper. More particularly, at least the section of the elastic intermediate portion adjacent the toe portion may extend in the medial half of the shoe upper. In this way, a better support (in particular during cutting movements) on the lateral side is achieved, as the comparably less elastic lateral portion may be made larger. Furthermore, if the shoe upper is to be used for example in a soccer shoe, the kick area on the top and lateral side of the shoe is larger as well. Indeed the kick area is beneficially stiffer. Also, the kick area may beneficially comprise a coating, in particular a gripping coating. As such coating may stiffen the upper, the elastic intermediate portion may be beneficially shifted toward the medial half of the shoe.

The length of the elastic intermediate portion may be between 20% and 60% of the length of the shoe upper. In some embodiments, the length of the elastic intermediate portion may be between 30% and 50% of the length of the shoe upper and may in particular be between 40% and 45% of the length of the shoe upper. Such a length of the elastic intermediate portion allows a wearer to comfortably put on and take off the shoe, while at the same time maintaining sufficient stability. In particular such length of the elastic intermediate portion permits the shoe to have sufficiently stiff portions so it may be maintained on the foot during athletic movements.

The width of the elastic intermediate portion may be between 10% and 60% of the width of the shoe upper. The width of the shoe upper is measured along the intersection of the surface of the shoe upper and of a cross-sectioning plane. In some embodiments, the width of the elastic intermediate portion may be between 20% and 40% of the width of the shoe upper. The width of the lowest part of the elastic intermediate portion (that is the part situated closest to the front of the elastic intermediate portion) may in particular be between 20% and 30% of the width of the shoe upper in this section of the shoe upper, and in some embodiments between 20% and 25%. The width of the highest part of the elastic intermediate portion (that is the part situated closest to the rear of the elastic intermediate portion, near the collar or opening of the shoe, for example) may in particular be between 25% and 50% of the width of the shoe upper in this section of the shoe upper, and in some embodiments between 33% and 40%.

If the elastic intermediate portion does not have straight edges, the lengths and widths indicated above may be understood as average lengths and widths. For example the width in the lowest part of the elastic intermediate portion may be understood as the average width of the lowest 10% of the elastic intermediate portion.

The shoe upper may further comprise at least one continuous one-piece layer at least partially covering the lateral portion and at least partially covering the intermediate portion. Thus, the transition between the elastic intermediate portion and the lateral portion may be made very smooth which is again particularly beneficial for example for a soccer shoe.

The shoe upper more particularly beneficially comprises at least one continuous one-piece layer extending over the entire shoe upper. This provides a shoe upper and a shoe with a very consistent layer and no seams. Indeed, seams may locally modify the properties of the shoe. With no seam, the local properties of the shoe upper are better controlled. It also provides a much better fit and comfort to the wearer of the shoe. Also, while a shoe upper comprising different pieces attached together to form the upper may wear quickly because the seams are weak points of the shoe, a shoe upper comprising at least one continuous one-piece layer may be more resistant. Such continuous construction of a one-piece layer may also allow attaching different pieces on each of its sides and ensures the relative positioning of these pieces.

The stiffness of the medial portion may be between 2 and 30 times higher than the stiffness of the intermediate portion. In particular, the stiffness of the medial portion may be between 2 and 25 times higher, and more particularly between four and 20 times higher, for example about 5 times higher than the stiffness of the intermediate portion. In particular, the stiffness of the medial portion may be between 2 and 8 times higher for a strain of below 10%, more particularly between 3 and 6 times higher for a strain of below 10%, for example of about 4 times higher for a strain of below 10% than the stiffness of the intermediate portion. In particular, the stiffness of the medial portion may be between 3 and 20 times higher for a strain between 10% and 20%, and more particularly between 4 and 11 times higher for a strain between 10% and 20% than the stiffness of the intermediate portion. In particular, the stiffness of the medial portion may be between 5 and 25 times higher for a strain between 20% and 30%, and more particularly between 5 and 20 times higher for a strain between 20% and 30%, for example of between 5 and 11 times higher for a strain between 20% and 30%, and in some embodiments about 5 times higher at 30% strain than the stiffness of the intermediate portion.

The medial portion may comprise a coating applied to a base layer, adapted to modify the stiffness of the base layer. In this way, the required ratio of the stiffness of the medial portion and the stiffness of the intermediate portion may be achieved. In particular, the stiffness of the medial portion is increased. A coating may also rigidify the shoe upper in the respective area, may provide waterproofing, may provide a better grip and/or may enhance the visual appearance of the shoe upper.

In some embodiments, a coating is a layer of a different material, in particular a material that is bonded to a base layer. In particular a coating may be a thin layer of polymer material bonded to a base layer such as for example a fabric, for example a knit fabric.

The coating may exhibit holes of any shape and size.

Alternatively or in combination, the coating may be in one piece on the shoe upper, or in different pieces. The shoe upper may in particular comprise a plurality of pieces of coating. At least some of the pieces of coating may at least partially overlap. The pieces of coating may be of the same material or at least one piece of coating may be of a first material and the other piece of coating may be of another material.

The coating may be applied in a solid or liquid state on the base layer. The coating may be applied in a solid state and then melted so as to bond to the base layer, or it may be glued on the shoe upper. Other methods such as for example stitching the coating on the base layer may be utilized additionally or alternatively in some embodiments.

The medial coating may extend from back to front of the shoe upper all along the length of the shoe on the medial side. This provides for support along the entire medial side of the shoe.

The stiffness of the lateral portion may be between 3 and 50 times higher than the stiffness of the intermediate portion. In particular the stiffness of the lateral portion may be between 3 and 40 times higher, and more particularly between 3 and 29 times higher, for example about 20 times higher than the stiffness of the intermediate portion. In particular, the stiffness of the lateral portion may be between 3 and 40 times higher for a strain below 10%, more particularly between 3 and 30 times higher for a strain below 10%, for example about 8 times higher for a strain below 10% than the stiffness of the intermediate portion.

In particular, the stiffness of the lateral portion may be between 10 and 40 times higher for a strain between 10% and 20%, and more particularly between 15 and 30 times higher for a strain between 10% and 20%, for example about 20 times higher for a strain between 10% and 20% than the stiffness of the intermediate portion. In particular, the stiffness of the lateral portion may be between 10 and 40 times higher for a strain between 20% and 30%, and more particularly between 14 and 29 times higher for a strain between 20% and 30%, for example between 22 and 29 times higher for a strain between 20% and 30%, or between 17 and 27 times higher at 30% strain than the stiffness of the intermediate portion.

The lateral portion may comprise a coating applied to a base layer, adapted to modify the stiffness of the base layer. In this way, the required ratio of the stiffness of the lateral portion and the stiffness of the intermediate portion may be achieved. In particular, the stiffness of the lateral portion is increased. A coating may also rigidify the shoe upper in the respective area, may provide waterproofing, may provide a better grip and/or may enhance the visual appearance of the shoe upper.

The lateral coating may extend from back to front of the shoe upper all along the length of the shoe on the lateral side. This provides for support along the entire lateral side of the shoe.

The stiffness of the lateral portion may be between 1 and 20 times higher than the stiffness of the medial portion. This provide for a better support of the foot in cutting movements. In particular, the stiffness of the lateral portion may be between 1 and 10 times higher, and more particularly between 1.3 and 5.0 times higher than the stiffness of the medial portion. For example, the stiffness of the lateral portion may be between 1.8 and 3.0 higher at 30% strain than the stiffness of the medial portion.

The shoe upper may comprise at least one forefoot coating applied to the forefoot portion of the shoe upper. Thus, stiffness of the forefoot portion is increased, the forefoot portion is reinforced and support of the foot is increased. A coating may also rigidify the shoe upper in the respective area, may provide waterproofing, may provide a better grip, or may enhance the visual appearance of the shoe upper.

The shoe upper may comprise at least one forefoot portion with a stiffness at least equal to the stiffness of the medial portion. Furthermore, the forefoot portion may comprise a vamp portion and a toe portion. The toe portion may cover the lower tip of the shoe upper. The width of the toe portion may be comprised between 5 mm and 30 mm from the sole. The vamp portion may have substantially the same stiffness as the medial portion (e.g. a ratio of 1). The stiffness of the toe portion may be between 0.4 and 1.4 the stiffness of the vamp portion, in particular between 0.6 and 1.2 the stiffness of the vamp portion, for example about 0.7 the stiffness of the vamp portion. Thereby, in some embodiments, the toe portion may be stiffer than the vamp portion, while in other embodiments the vamp portion may be stiffer than the toe portion.

Additionally, the medial portion may comprise a lower portion adapted to be placed along the sole and a higher portion between said lower portion and the intermediate portion. The stiffness of the lower portion and the stiffness in the higher portion may have the same stiffness ratio as the vamp portion and the toe portion. In particular, the stiffness of the lower portion of the medial portion may be the same as the stiffness of the toe portion. The stiffness of the higher portion of the medial portion may be the same as the stiffness of the vamp portion.

Additionally, the lateral portion may comprise a lower portion adapted to be placed along the sole and a higher portion between said lower portion and the intermediate portion. The stiffness of the lower portion and the stiffness in the higher portion may have the same stiffness ratio as the vamp portion and the toe portion. In particular the stiffness of the lower portion of the lateral portion may be the same as the stiffness of the toe portion. The stiffness of the higher portion of the lateral portion may be the same as the stiffness of the vamp portion.

Thereby a portion of the shoe upper may extend along the sole, e.g. from the front tip of the shoe and along the medial side and the lateral side with substantially the same stiffness. This portion may extend on the lateral side and/or on the medial side until a heel portion of the shoe upper. Such portion may provide support all around the shoe, and may provide a smoother transition from the sole's stiffness to the average upper's stiffness.

The shoe upper may comprise at least one heel portion comprising a coating applied to a base layer, adapted to modify the stiffness of the base layer. In this way, the stiffness of the heel portion is increased, the heel is reinforced, and support of the foot is increased. A coating may also rigidify the shoe upper in the respective area, may provide waterproofing, provide a better grip, or enhance the visual appearance of the shoe upper.

The shoe upper may comprise at least one coating applied essentially to an entire base layer of the shoe upper except in the elastic intermediate portion. This provides for maximum support of the shoe, while the shoe may be easily put on and taken off due to the elastic intermediate portion. A coating may also rigidify the shoe upper in the respective area, may provide waterproofing, provide a better grip or enhance the visual appearance of the shoe upper.

In some embodiments the elastic intermediate portion may also comprise an elastic coating, with a function of, for example, waterproofing the elastic intermediate portion.

The shoe upper may comprise a knitted layer. Knitting allows the shoe upper to be manufactured essentially without any waste.

The shoe upper may be knitted in one piece and extend on at least 80% of the surface area of the shoe upper. Thus, additional manufacturing steps of assembling the shoe upper from separate pieces may be omitted.

Furthermore, certain functional areas may be provided during the knitting process by varying the knit structure in selected zones of the shoe upper. Thereby a continuous one-piece layer of the shoe upper is provided but with different functional areas, having different characteristics such as stiffness, breathability, etc.

The shoe upper may further comprise a first area having a first knit structure and a second area having a second knit structure different from the first knit structure. In this way, certain functions may be imparted to selected areas of the shoe upper. For example, over the vamp portion a rather open knit structure may be used to facilitate ventilation and grip on a ball, whereas the parts of the knitted shoe upper which are to be joined to the sole may comprise a very tight knit to improve the support of the foot, increase stability of the entire shoe and ensure a strong attachment to the sole.

The shoe upper may therefore comprise:
at least one layer of fabric, for example a knit layer with different knit structures,
at least one continuous layer in one piece, for example the knit layer,
a coating, applied on at least one of the layers of the shoe upper, for example on the outer surface of the knit layer.

The shoe upper may additionally comprise at least one element of the following elements:
a stiffening element on the medial portion, for example on the outer side of the coated knit layer, a stiffening element on the lateral portion, for example on the inner side of the knit layer,
a stiffening element in the forefoot portion, whether in the vamp portion and/or in the toe portion, or
a comfort element in at least one area of the upper (for example foam paddings).

The knit layer of the shoe upper may be placed with the weft direction in a medial-lateral direction of the upper; therefore the warp direction may be in the longitudinal direction of the shoe upper.

The shoe upper may further comprise an elastic collar surrounding the shoe opening. Thus, putting the shoe on and off becomes more comfortable as the collar may stretch when the foot is inserted into the shoe. Furthermore, the elastic collar may provide fit around the foot, more specifically around the ankle portion, below, on, or above the ankle.

The stiffness of the collar may be between 0.2 and 3.0 times the stiffness of the elastic intermediate portion, in particular between 0.3 and 0.8 the stiffness of the elastic intermediate portion. These values particularly apply to strain values between 0% and 30% of the initial length of the material, at a third cycle testing of a non-used material.

The shoe upper may further comprise a holding tab proximate the junction between the elastic intermediate portion and a collar of the shoe. A holding tab allows to hold the shoe upper and in particular the U-throat portion while inserting or extracting the foot into or out of the shoe.

The previously mentioned shoe may comprise: (a.) a sole; and (b.) a shoe upper as described herein being attached to the sole.

The shoe may further comprise a sock arranged at least partially inside the shoe upper. The sock may ensure a better fit around the foot and improve the foot's stability. The sock may be attached to the shoe upper for example by stitching, gluing or welding. The sock may be attached to the shoe upper at the collar portion of the shoe upper, at a lateral and a medial side of a junction between the shoe upper and a sole, and at a forefoot portion of the shoe upper.

The internal sock may be adapted to cover at least a dorsal portion of a foot. In particular it may be adapted to cover a medial portion of a foot, and not the heel portion of the forefoot portion of a foot.

The internal sock may be knitted. The internal sock may more particularly be knitted with a very open structure, namely exhibiting holes.

The internal sock may comprise elastic yarns, such as elastane for example, to ensure a very low stiffness, and a high elasticity and recovery. This also provides for a better fit and compression of the foot.

The shoe may further comprise a shoe upper with a holding tab as described before, wherein a first end of the holding tab is attached to the shoe upper, and a second end of the holding tab is attached to the sock. This allows a wearer of the shoe to hold both the shoe upper and the sock while inserting the foot into the shoe, so that the shoe upper and the sock remain in a correct position.

The first end of the holding tab may be attached to the shoe upper at the top of the intermediate portion. This avoids folding of the upper area of the U-throat portion, when the foot is inserted into the shoe, because the wearer may slightly lift the U-throat to facilitate inserting the foot into the shoe.

The shoe may be a soccer shoe. The coating applied to the fabric may be a thermoplastic coating. In particular, the coating may be polyurethane. Alternatively or in combination, the coating may comprise a plurality of layers, such as e.g. a layer of a thermoset chosen for the functionality it brings to the fabric, and a layer of a thermoplastic chosen for its ability to bond with the fabric under pressure differential and heat application.

The article may be a piece of apparel. The piece of apparel may be a T-shirt, a polo, shorts, pants, a swimming suit, etc. Accordingly, the coating may be a waterproofing coating. Alternatively or in combination, the coating may be a drag-lowering coating. This may be achieved either by the material of the coating and/or by its surface texturing. Such a coating may be decorative or may be associated with a decorative coating.

The article may be a wearable accessory. Thus, the article may be a backpack, a sports bag, a cap, etc. Accordingly, the coating may be a waterproofing coating and/or a stain-resistant coating. Such a coating may be decorative or may be associated with a decorative coating.

A still further aspect of certain embodiments relates to a device for manufacturing an article comprising a fabric, wherein the device comprises: (a.) a support structure, wherein the support structure is adapted to permit gas circulation through at least a portion of its surface and comprises at least a raised or embossed portion on its surface, and wherein the support structure is adapted to hold a fabric and a coating such that at least a portion of the fabric and the coating is arranged over the raised or embossed portion; and (b.) a vacuum source connected to the support structure for applying a gas pressure differential between two opposite faces of a fabric placed on the surface of the support structure.

On such a device, a fabric and a coating may be placed at least in part over the raised or embossed portion of the support structure. The coating may be placed above the fabric or below.

The support structure is adapted to permit gas circulation through at least a portion of its surface. To this effect, the support structure may comprise a plurality of holes pneumatically connected to at least one low pressure source (eg. a vacuum pump). Thus, a gas pressure differential may be applied between the upper surface of the coating and the lower surface of the fabric. The holes are placed on the surface of the support structure in a configuration adapted to ensure that a piece of fabric may cover at least one hole of the plurality of holes when placed on the surface with at least a portion on the raised or embossed portion. Therefore when a gas pressure differential is applied, some gas may flow through the fabric.

The device in certain embodiments achieves a very good bonding between the coating and the fabric due to the pressure differential. Thus, the coating is not simply pressed against the fabric, but is additionally sucked into the fabric. This in particular may be beneficial with thin-film coatings or liquid coatings. It in particular may be beneficial with non-flat fabrics to ensure that the coating conforms to the surface texturing of the fabric and therefore bonds and properly covers the fabric's surface. For example, a liquid coating may be sprayed on the fabric and may be sucked at least partially through the fabric, where it may dry. The bonding obtained is therefore better as the coating may at least partially penetrate between the fabric's fibers. When the coating is applied to protect the fibers of the fabric, e.g. against water, this may also permit a better protection of the fibers to be obtained.

Furthermore, the usage of fabric, in particular knitted fabric with the device according to certain embodiments is beneficial as it permits a good passage of gas due to the fabric's open meshed structure. By applying the pressure differential, the coating may be bonded to the mesh structure.

The device may further comprise a draping membrane adapted to be placed on the fabric and the coating. The draping membrane may additionally apply pressure to the coating and the fabric while the pressure differential is applied to improve the bonding. Furthermore, the draping membrane may help to maintain the coating on the fabric before bonding.

The draping membrane may beneficially be gas-proof to the gas under which the pressure differential is applied. Thus, the draping membrane may be firmly pressed onto the coating and the fabric and may exert an additional pressure to increase the bonding. If air is used, the draping membrane may be at least partially airproof, that is sufficiently airproof to be sucked relative to the support structure when a vacuum is applied through the surface of the support structure.

The raised or embossed portion may be releasably attached to the support structure. Thus, different raised or embossed portions with varying sizes and/or shapes may be used, such as to manufacture e.g. shoe uppers of different sizes and/or shapes.

The device may be adapted to perform a method as described herein and in particular as described above.

The device may be adapted to manufacture an article as described herein and in particular as described above.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

An example of a method of manufacturing an article comprising a fabric according to some embodiments is now described with respect to FIGS. 1A, 1B, 1C, 1D and 1E. The method comprises a first step (a.) of providing a fabric 10 comprising a first surface and a second surface opposite the first surface. In the example of FIGS. 1A, 1B, 1C, 1D and 1E the fabric 10 has the shape of a shoe upper for a shoe. Thus, in this example, the shoe upper is made from the fabric 10 in one piece. However in some embodiments the shoe upper—or in general any article to be manufactured by a method disclosed herein—may be partly made from the fabric 10 and may comprise other materials, e.g. woven fabrics, non-woven fabrics, meshes, etc. as well. Furthermore, embodiments may be applied to all sorts of articles, be it end products (such as shoes, apparel, accessories, etc.), intermediate products (such as shoe uppers) or preliminary products (such as fabrics, textile components, etc.).

In the example of FIGS. 1A, 1B, 1C, 1D and 1E, the fabric 10 is a knitted fabric. The knitted fabric 10 could be weft-knitted or warp-knitted and may be manufactured on a suitable knitting machine. Also, the knitted fabric could be flat knitted or circular knitted. It should be noted, however, that the invention is not limited to knitted fabrics and could be applied to fabrics like woven or non-woven fabrics, meshes, etc. as well.

The method comprises the step (b.) of placing the fabric on a surface 12 of a support structure 11. In the example of FIGS. 1A, 1B, 1C, 1D and 1E the support structure 11 comprises a flat table with a raised portion 13 on its surface 12 (see FIG. 1A). An embossed portion could be used as well.

In some embodiments, as may be seen in FIG. 1A, the raised portion 13 is a modular piece which is arranged on the surface 12 of the support structure 11. Thus, the raised portion 13 may easily be exchanged for example with a raised portion 13 having a different size and/or shape. In this way, the raised portion 13 may be adapted for manufacturing shoe uppers or shoes of different sizes. In other embodiments, however, the raised portion 13 may be integral with the surface 12 of the support structure 11.

The fabric 10 comprises a first, lower surface facing a support structure 11, and a second, upper surface facing away from the support structure 11.

The support structure 11 is adapted to permit gas circulation through at least a portion of its surface 12. Gas circulation could for example be achieved by perforations in the surface 12. The gas may be ambient air.

The fabric 10 is placed such that the first surface of the fabric faces the surface 12 of the support structure 11 and such that the fabric 10 is arranged at least in part over the raised portion 13 of the support structure 11. In the example of FIGS. 1A, 1B, 1C, 1D and 1E a part of the instep portion (or U-throat) of the shoe upper is placed over the raised portion 13. Accordingly, the raised portion 13 has the shape of an instep of a last. In different embodiments it is possible that the raised portion 13 corresponds to an ankle portion and/or to a top portion of a dorsal part of a last. In different embodiments the support structure 11 or a part thereof may have the shape of a shoe last.

The method comprises a step (c.) of providing at least one coating 14 comprising a first surface and a second surface opposite the first surface. In the some embodiments, such as shown FIGS. 1A, 1B, 1C, 1D and 1E, the coating 14 is a thin film of a polymer material, eg. PU. The coating's material for example has a hardness in the range of 40-80 Shore A. Other materials could be used as well for the coating 14. In some embodiments, the film has a thickness of about 0.3 mm. In other embodiments, it is possible to apply a liquid coating for example by spraying or painting.

The method comprises a step (d.) of placing the coating 14 at least partially on the second surface of the fabric 10, such that the first surface of the coating 14 faces the fabric 10. Thus, in this method step the coating 14 is arranged above the fabric 10.

Figure 1B:
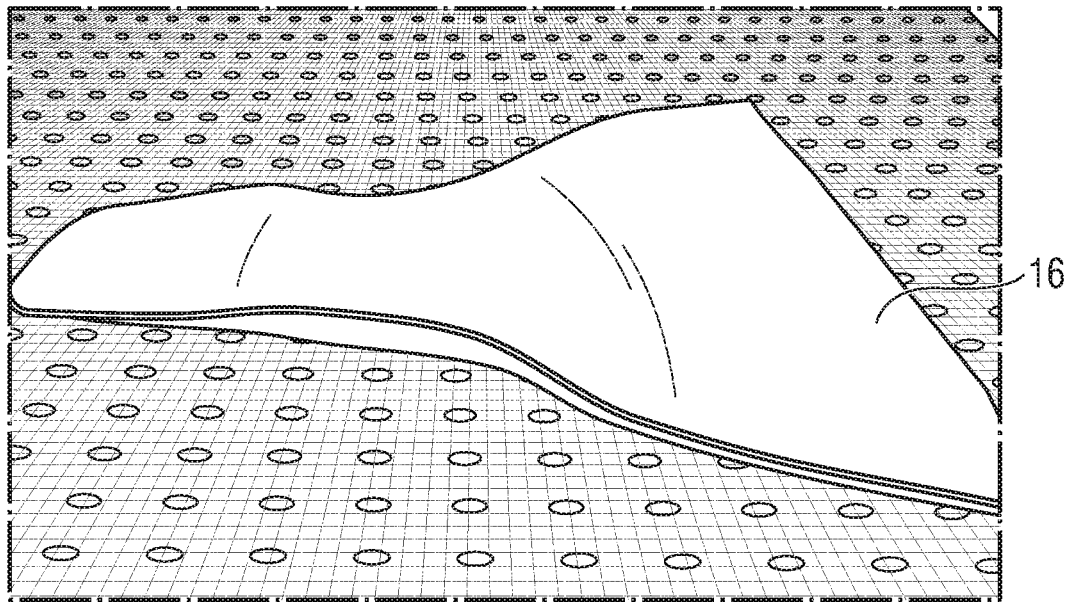
Figure 1C:
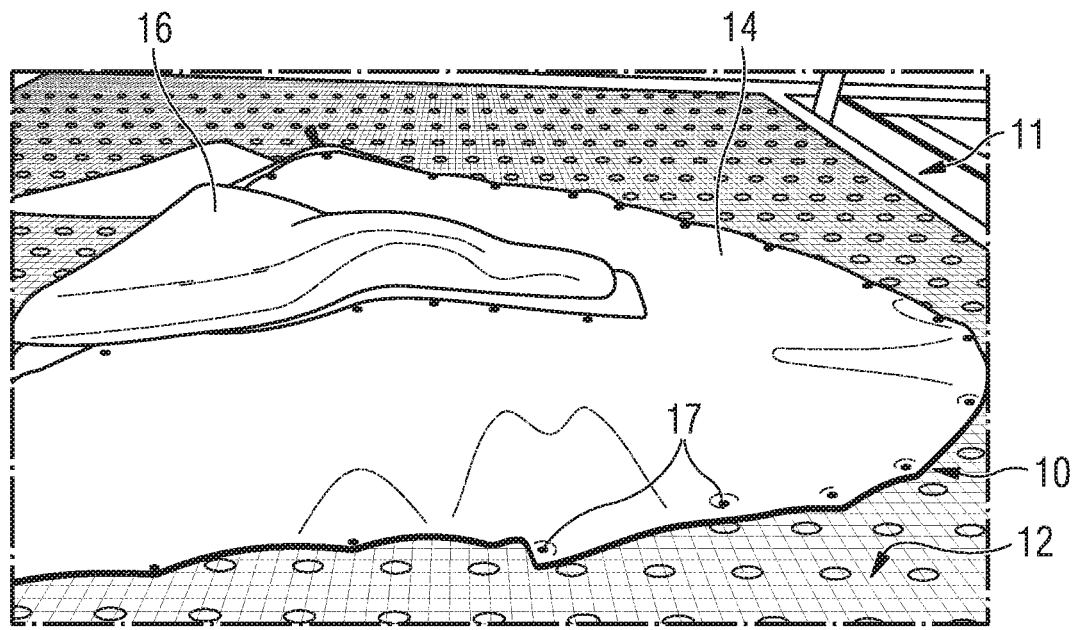

In the example of FIGS. 1A, 1B, 1C, 1D and 1E an optional step is shown, namely the placing of a shell (or female mold) 16 over the fabric 10 and optionally partially over the coating 14 (see FIG. 1C). As shown in FIG. 1B, the shell 16 has a shape which is adapted to engage with the shape of the raised portion 13. Thus, the fabric 10 and the coating 14 arranged on top of the fabric 10 are firmly held in place for the subsequent method step and both are very well conformed to the shape of the raised portion 13. Furthermore, the shell 16 protects the U-throat area from the heat which may be used to apply the coating to the fabric as will be described below, as most fabrics (including knitted fabrics) will degrade under heat. Therefore, the shell 16 may comprise a heat insulation layer which reflects IR radiation. Furthermore, the shell 16 may cover the entire U-throat area to avoid degradation of the fabric at locations where no coating is applied.

The method comprises a step (e.) of applying a gas pressure differential between the second surface of the coating 14 and the first surface of the fabric 10. To this end the support structure 11 could be connected to a vacuum source such as a pump to evacuate ambient air through perforations in the surface 12 of the support structure 11. In this way a pressure differential is obtained between the upper surface of the coating 14 and the lower surface of the fabric 10.

It should be noted that instead of a single coating 14, a plurality of coatings could be placed on the fabric 10. The coatings may coincide, overlap or be separate from each other. Also, the coatings may vary in size, shape, and/or thickness. Coatings may differ in the material used and/or in the state of the material. For example, one coating may be a thin polymer film, whereas another coating may be a liquid polymer.

Figure 1D:
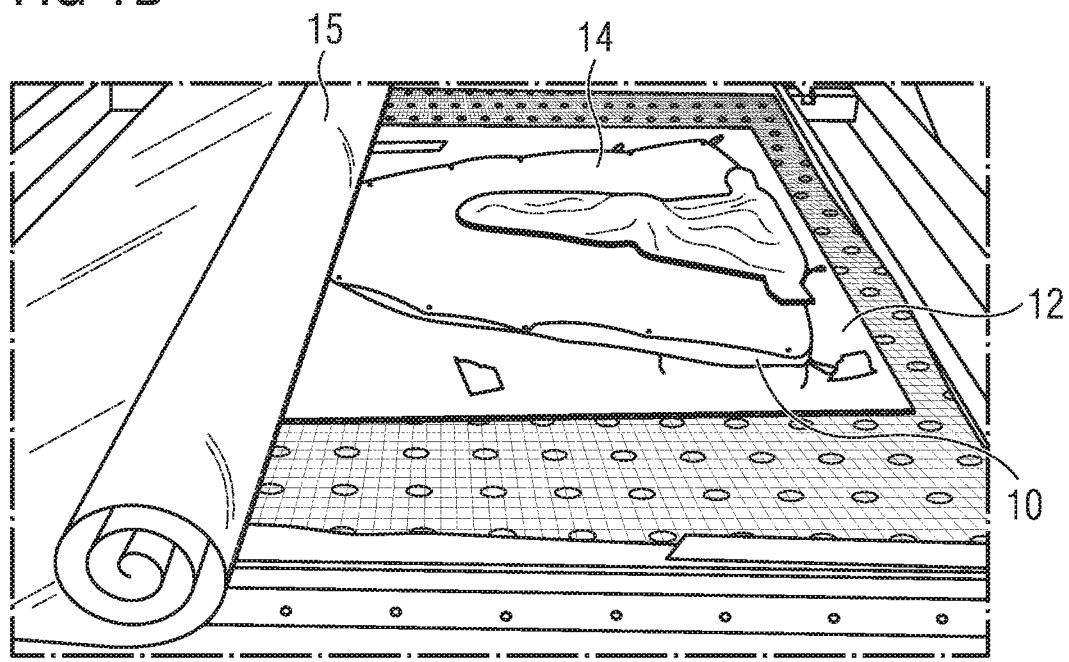
Figure 1E:
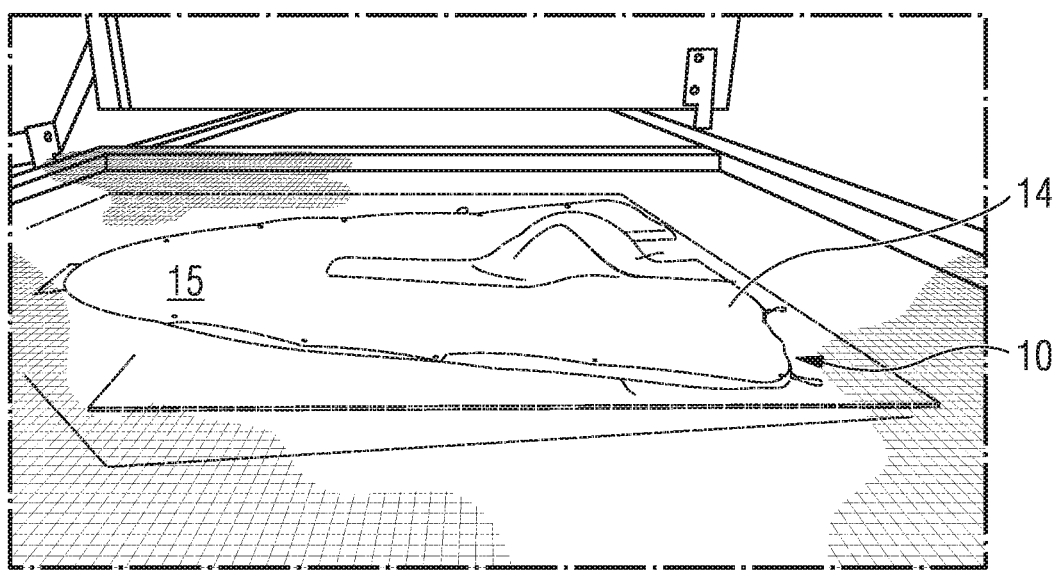

In the example of FIGS. 1A, 1B, 1C, 1D and 1E a gas proof draping membrane 15 (see in particular FIG. 1D) is additionally used to increase the pressure on the coating 14 and the fabric 10. As shown in FIG. 1D, after the coating 14 and the optional shell 16 have been placed on the fabric 10, the draping membrane 15 is placed over the coating 14 and the fabric 10. When the pressure differential is applied the ambient air between the fabric 10 with the coating 14 and the draping membrane 15 is evacuated and the draping membrane 15 is firmly pressed against the coating 14 and the fabric 10 by the vacuum as shown in FIG. 1E. It should be noted that the draping membrane 15 is optional just like the shell 16.

If a liquid coating or a solid thin film of coating is used, it is sucked through the mesh structure of the fabric 10 by the pressure differential and dries to create a firm bond with the mesh structure.

To improve the bonding between the coating 14 and the fabric 10, the method may further comprise the step of heating the coating 14. Heat may be applied for example by heating the support structure 11 and/or by heating a draping membrane 15 if present. If the heating membrane 15 is made from a transparent material, infrared radiation or microwaves could be used to heat the coating 14. Furthermore, the support structure could be heated. To increase the bonding, heat should be applied simultaneously with the pressure differential.

FIGS. 1A, 1B, 1C, 1D and 1E have been described in relation to a shoe upper. However, it is possible to apply embodiments of methods disclosed herein to arbitrary kinds of articles comprising fabric. Thus, the article may be a wearable accessory such as a backpack, a sports bag, a cap, etc. Accordingly, the coating 14 may be a waterproofing coating and/or a stain-resistant coating. Such a coating may be decorative or may be associated with a decorative coating. The article may also be a piece of apparel such as a T-shirt, a polo-shirt, shorts, pants, a swimming suit, etc. Accordingly, the coating 14 may be a waterproofing coating. Furthermore, the coating 14 may be a drag-lowering coating. This may be achieved either by the material of the coating and/or by its surface texturing. Such a coating may be decorative or may be associated with a decorative coating.

The method according to certain embodiments allows use of a coating film in one piece and ensures that it is perfectly placed on a three-dimensional article. To build upon the example above, if the coating 14 had been applied to the shoe upper on a flat surface instead of an embossed surface, the opening of the shoe may not have been wide enough, i.e. the opening of the final shoe would be too narrow to introduce a foot in the shoe; besides the coating 14 may tear when putting on the shoe. Also in this example, if the coating was applied with the upper on a completely flat surface, the U-throat would not have a shape conforming to a foot, and it may even wrinkle during the coating application. Placing the fabric 10 over the raised portion 13 of the support structure 11 ensures that the fabric 10 takes the right shape and forms a sufficiently wide opening when used as a shoe upper.

FIG. 2 shows a flowchart of method steps according to an example of a method of the invention for manufacturing a shoe upper. In method step 21 a fabric is placed on a surface of a support structure. The fabric in this example may be a knitted fabric. The support structure in this example comprises a raised portion. The fabric is placed on the surface of the support structure with an area of the fabric adapted to form a tongue area (or U-throat) of a shoe upper arranged over the raised portion of said support structure.

In method step 22 at least one coating is placed on the fabric. The coating may for example be a polyurethane film with a thickness of 0.3 mm. In an optional step (not shown in FIG. 2), the coating may be pre-positioned on the fabric with an ultrasonic welding machine. To this end, the coating may be temporarily fixed to the fabric at a number of weld points, for example 14 weld points. Two of those optional welding points are denoted in FIG. 1C with the reference numeral 17. The coating film may also be weakly bonded to the fabric, for example by heating its underneath surface before placing it on the fabric such that it will not move relatively to the fabric before it is definitively bonded by vacuum and heat application.

In method step 23 the device is closed, i.e. an optional draping membrane is placed over the fabric and the coating.

In method step 24 a vacuum is applied, that is air is sucked by the holes of the surfaces of the support structure. The vacuum is applied across the coating and the fabric. Thus, the draping membrane is firmly pressed against the coating which in turn is sucked towards the fabric. The vacuum pressure may be 0.1 MPa (100 kg/cm$^2$).

In method step 25 heat is applied to the coating. The heating temperature may be in a range of 150-190° C., and in some embodiments 160-180° C. Heat may in some embodiments be applied for a duration of between 120 and 240 seconds, for example 180 seconds.

In method step 26 heating is terminated and the coating is cooled. The coating may be cooled down to a temperature of 50-60° C. within 40 seconds.

In method step 27 the vacuum is released.

It should be noted that other optional method steps may be performed before, in between or after the method steps mentioned above. For example, further elements like toe or heel caps, decorations, logos, etc. could be placed on the upper.

FIG. 3 shows a flowchart of method steps according to an example of a method of manufacturing a shoe according to the present invention.

In method step 31 a knit upper is provided. Such a knit upper may have been manufactured in a previous method step in one piece for example on a knitting machine. Alternatively, the upper could be cut from a roll of knitted fabric.

In method step 32 method steps 21 to 27 of FIG. 2 are performed to provide a coated fabric.

According to method step 33 the upper is cut to its final in shape. Instead of cutting, the upper could also be punched.

In method step 34 the upper is stitched. First, the back of the heel is stitched, then the bottom of the rearfoot portion is stitched.

In method step 35 the upper is placed on a last and the bottom of the forefoot portion of the upper is stitched.

Finally, in method step 36 the upper is assembled with a sole. For example, the upper could be stitched, welded or glued to the sole.

It should be noted that other optional method steps may be performed before, in between or after the method steps mentioned above. For example, further elements like toe or heel caps, decorations, logos, etc. could be placed on the upper.

Figure 4:
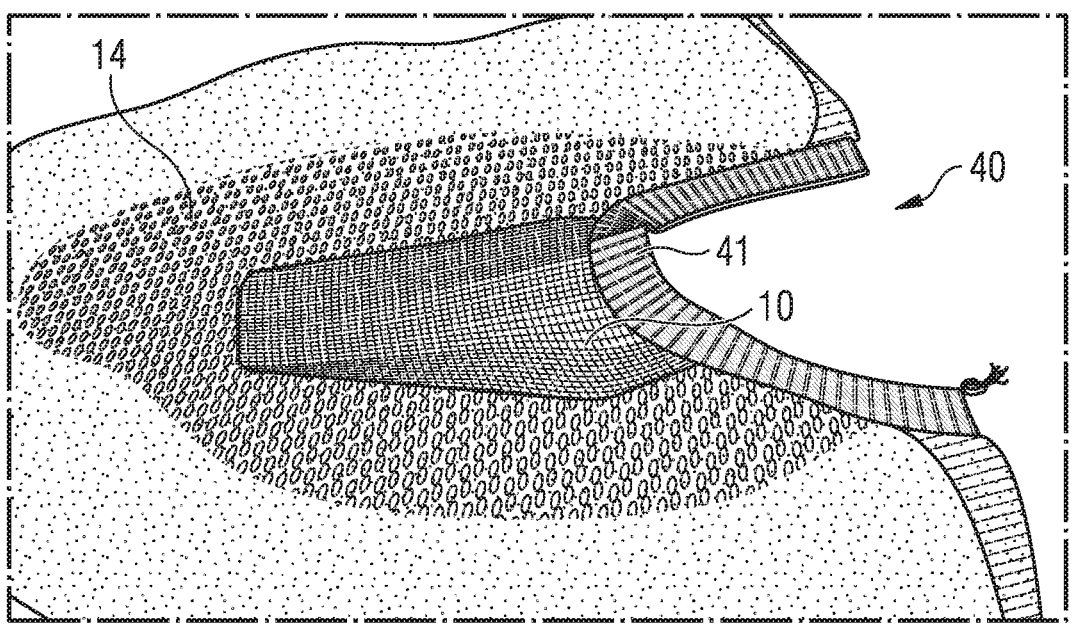
FIG. 4 shows a shoe upper, according to certain embodiments of the present invention.

FIG. 4 shows an example of a shoe upper 40 which has been manufactured according to a method of some embodiments. The upper comprises a fabric 10 with a coating 14 which has been applied as described above with respect to FIGS. 1A, 1B, 1C and 1D. The fabric in this example is knitted and the coating is a PU coating with a thickness of 0.3 mm. As may be seen in FIG. 4, the coating perfectly conforms to the knitted fabric, even to its texturing.

The U-throat area has a raised portion 41 formed during the previous manufacturing steps. Such raised portion provides a better fit—in particular facilitates the foot introduction and extraction relative to a shoe—and avoids formation of wrinkles during the manufacturing process.

Figure 5A:
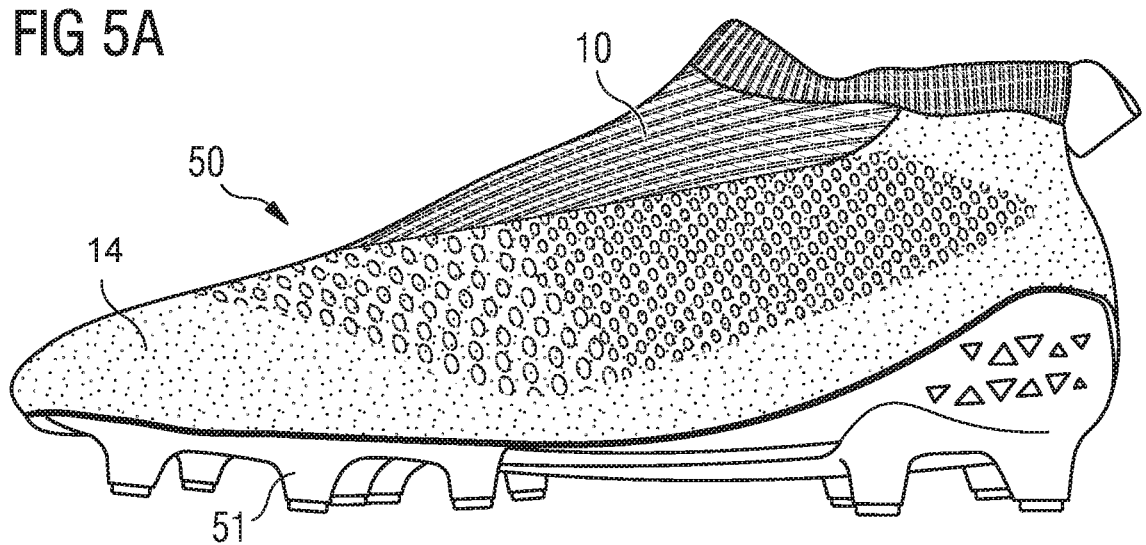
FIG. 5A is a medial view of a shoe, according to certain embodiments of the present invention.
Figure 5B:
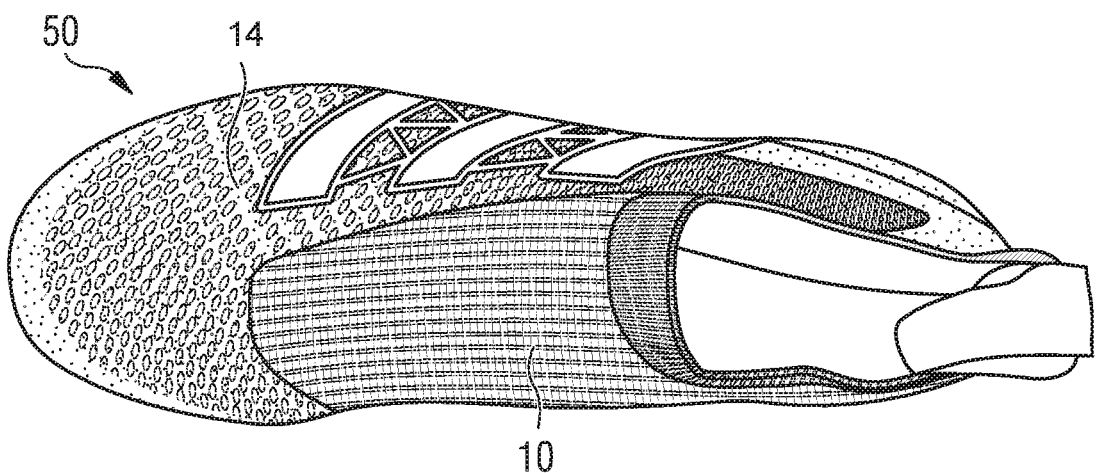
FIG. 5B is a top view of a shoe, according to certain embodiments of the present invention.
Figure 5C:
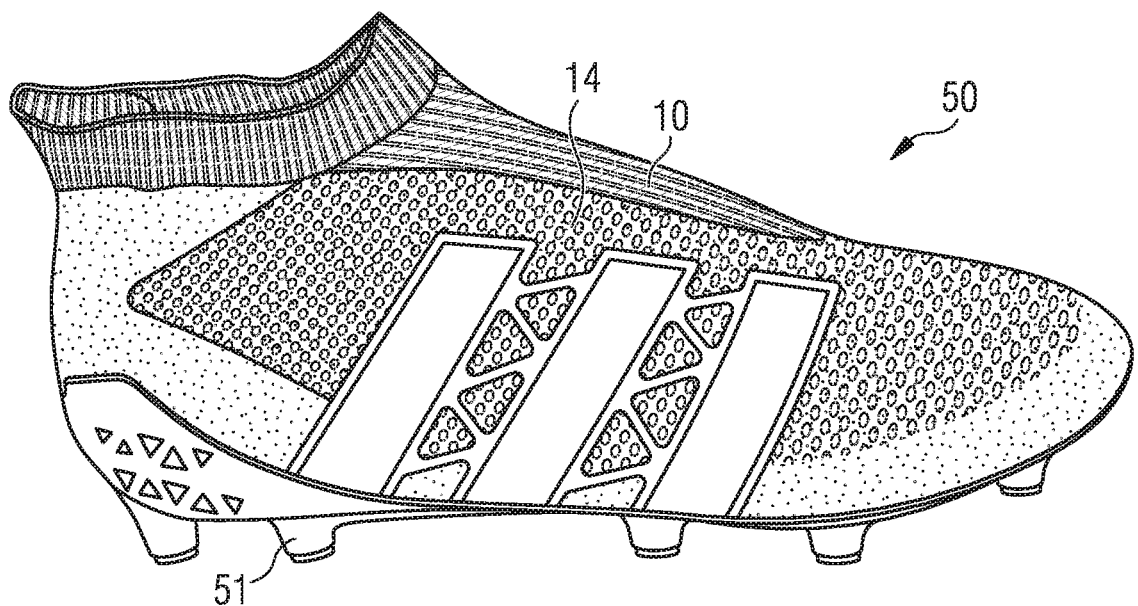
FIG. 5C is a lateral view of a shoe, according to certain embodiments of the present invention.

FIGS. 5A, 5B and 5C show an example of an article 50 obtained by the method according certain embodiments. In this example the article is a soccer shoe 50 comprising a knitted fabric 10 forming the shoe upper and a studded sole 51 joined to the shoe upper. In this example the knitted fabric 10 forms the outer layer of the shoe upper in one piece. However, in different embodiments it is possible that the shoe upper is formed by two or more knitted fabrics joined together e.g. by sewing, gluing or welding. It is also possible that the shoe upper comprises in addition to at least one knitted fabric 10 other materials like meshes, woven fabrics, nonwoven fabrics, etc.

In the example of FIGS. 5A, 5B and 5C the shoe 50 is a laceless shoe. Thus, the shoe upper does not comprise any laces in the area of the instep portion. Instead, the shoe 50 is coupled to the foot of a wearer mainly by the stretch and elasticity of the knitted fabric 10. A tight fit and increased stability is provided by the coating 14 which covers most of the upper, i.e. the medial side (see FIG. 4A), the lateral side (see FIG. 4C), the toe area (see FIG. 4*b*) and the heel area (see FIGS. 4A and 4C). The coating 14 is applied to the knitted fabric 10 of the shoe 50 according to the method described above with respect to FIGS. 1A, 1B, 1C, 1D and 1E.

In some embodiments, as may be seen in FIGS. 5A, 5B and 5C, the coating perfectly conforms to the knitted fabric, even to its texturing, in particular in the forefoot and medial portions. This may be beneficially achieved by certain embodiments of the methods disclosed herein.

Figure 6A:
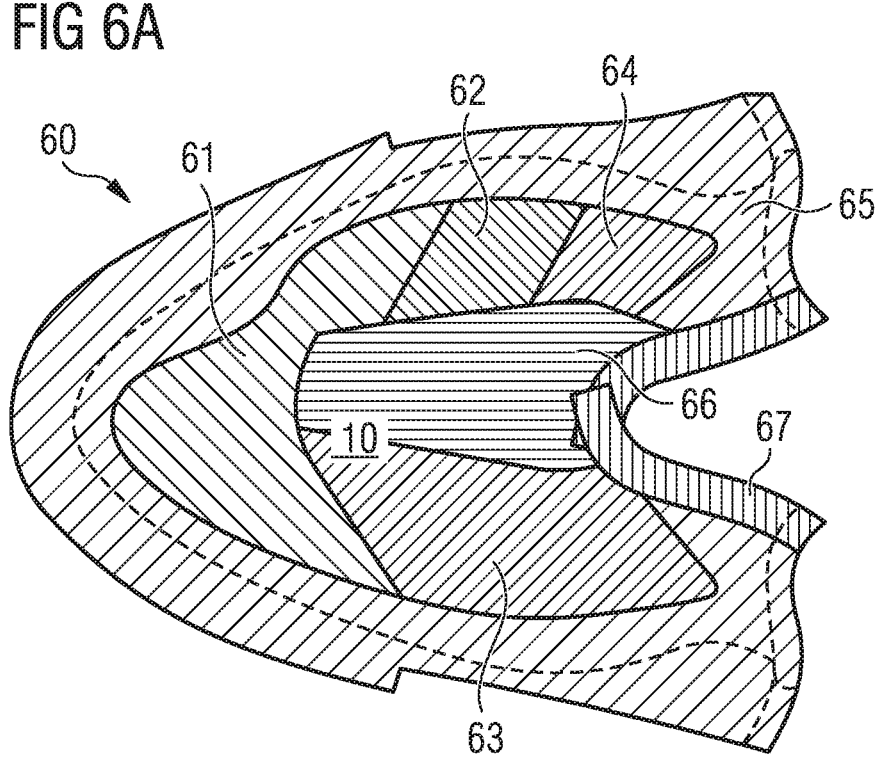
FIG. 6A is a top view of a knitted shoe upper, according to certain embodiments of the present invention.
Figure 6B:
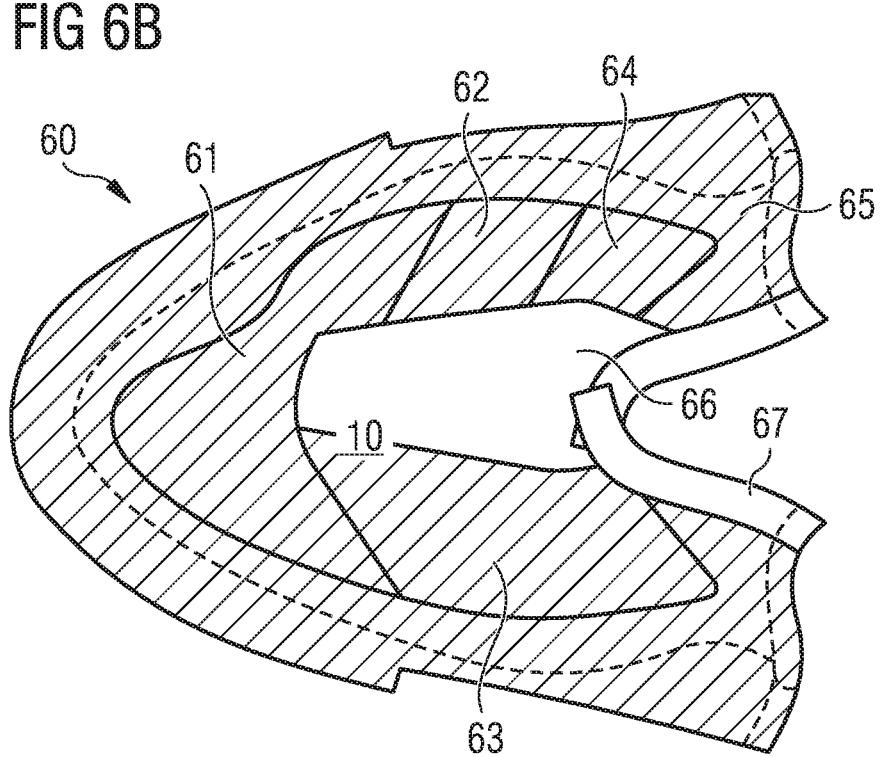
FIG. 6B is a top view showing a coating layout of the knitted upper according to FIG. 6A.

An example of a base layer of a shoe upper according to some embodiments is described with reference to FIGS. 6A and 6B. FIG. 6A shows an example of a knit structure of a base layer of a shoe upper 60 which is knitted, whereas FIG. 6B shows the corresponding coating layout of the layer of a shoe upper 60. The fabric 10 of the shoe upper 10 may be knitted on a conventional knitting machine and may be based on a flat or circular knit. However, it should be noted that the present invention is not restricted to knitted shoe uppers and that the shoe upper 10 may be made from other materials, such as woven fabrics, non-woven fabrics, meshes, etc. as well. Also, while the shoe upper shown in FIGS. 6A and 6B is a one-piece knit, in general, the shoe upper 60 may be made from several pieces which are joined e.g. by gluing, stitching or welding.

The knit layer shown in FIG. 6A is a continuous one-piece knit layer comprising different knit structures in different areas.

The vamp portion 61 shown in FIG. 1A is based on a very open knit structure with holes. The medial portion 62 is based on an open knit structure (70%) and comprises holes of smaller size than the vamp portion 61. It is based on a transfer stitch.

The lateral portion 63 is based on a medium open knit structure. It is based on transfer stitch as well. The medial portion 64 is based on a medium open knit structure. It is based on transfer stitch as well. The portion 65 connecting the shoe upper 60 to a sole of a shoe is based on a tight knit structure. In this way, the stability of the upper may be increased as the comparably stiff and inelastic tight knit portion 65 of the shoe upper may be directly joined to the sole (e.g. by gluing, stitching or welding) and provides support all around the foot. The portion 65 is based on a tuck stitch.

The intermediate (or dorsal, or U-throat) portion 66 is a tight knit structure based on a tuck stitch as well.

In some embodiments, for example, as shown in FIGS. 1A and 1B, the layer of a shoe upper 60 includes at least two medial portions 62 and 64. A part of the vamp portion 61 may be considered as a medial portion as well. Likewise, the vamp portion 61 may extend to the lateral side of the shoe upper 60, such that a part of the vamp portion 61 may be considered as a lateral portion. In any case, the intermediate portion 66 is arranged between at least one medial portion and at least one lateral portion.

In some embodiments, such as in FIGS. 6A and 6B, different yarns may be used. If, for example only PES yarns are to be used, the yarns in the dorsal throat portion 65 may be based on 90.8% polyester and 9.2% spandex for example. If, however, yarns with additional nylon are used, the composition of the yarns may for example be 87.5% polyester, 3.3% nylon and 9.2% spandex.

Finally, the collar portion 67 is based on a collar rib made with a tuck stitch. This makes the collar portion 67 rather elastic to facilitate insertion of the foot. In some embodiments, as may be appreciated with reference to FIGS. 6A and 6B, different yarns may be used for that portion as well. If, for example only PES yarns are to be used, the yarns in the collar portion 66 may be based on 64.4% polyester and 35.6% spandex for example. If, however, yarns with additional nylon are used, the composition of the yarns may for example be 51.7% polyester, 12.7% nylon and 35.6% spandex.

In some embodiments, such as shown in FIGS. 6A and 6B the size (i.e. the linear mass density) of the yarns may be 840 Deniers. However, yarns of different sizes may be used in different embodiments. Also, it is to be noted that the arrangement of portions, knit structures and composition of yarns described above is only by way of example. Accordingly, different arrangements of portions, different knit structures and different yarns may be used in the context of the present invention.

FIG. 6B shows the layout of a coating which is applied to the fabric 10 of the knitted upper 60 of FIG. 6A. As shown in FIG. 6B, the coating is applied to the portions 61 to 65. The coating is not applied to the intermediate (or dorsal, or U-throat) portion 66 to maintain the elasticity of this portion.

Furthermore, the coating is not applied to the collar portion 67 to maintain its elasticity as well.

Applying the coating to the portions 61 to 65 permits stiffness to be increased for the lateral, medial, and forefoot portions. The coating may be applied as described herein. In addition to reducing elasticity of the knit, the coating may also impart waterproofing, grip or other properties to the knit.

Additionally or alternatively to a coating, pieces of coating may be applied to the knitted upper 60. Such pieces of coating may be applied to the coating (on top or below) or directly to the knit layer. Such pieces of coating may also be applied to modify the stiffness of the knit layer.

Figure 7A:
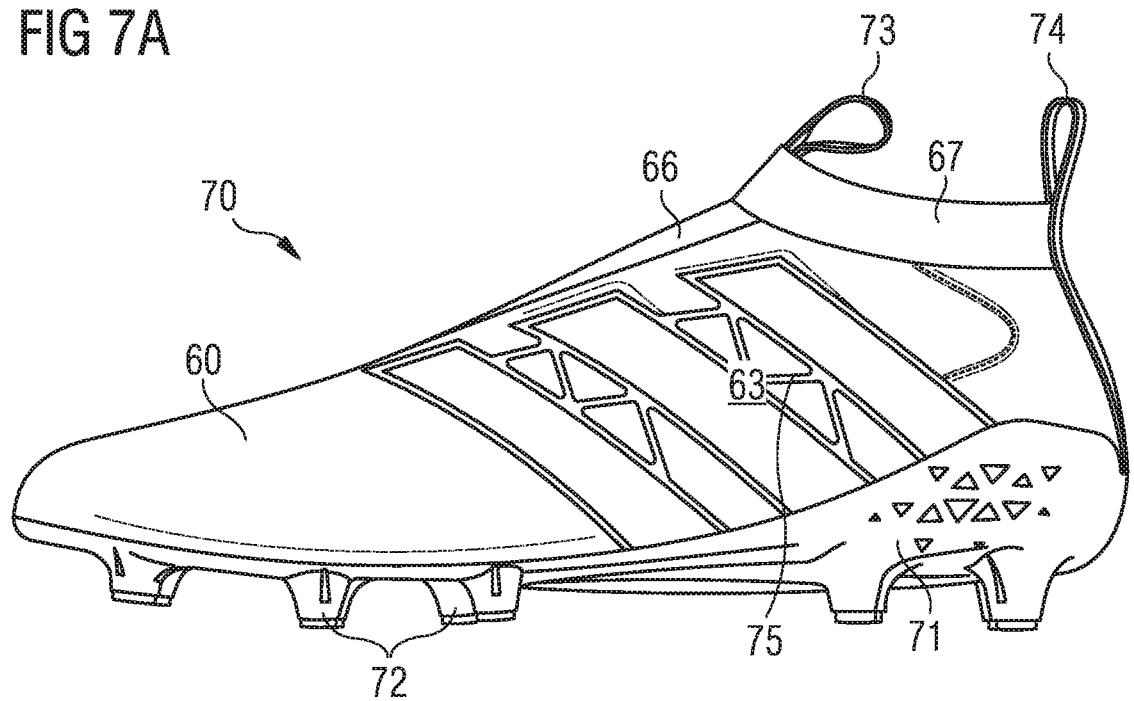
FIG. 7A is a lateral view of a shoe, according to certain embodiments of the present invention.
Figure 7B:
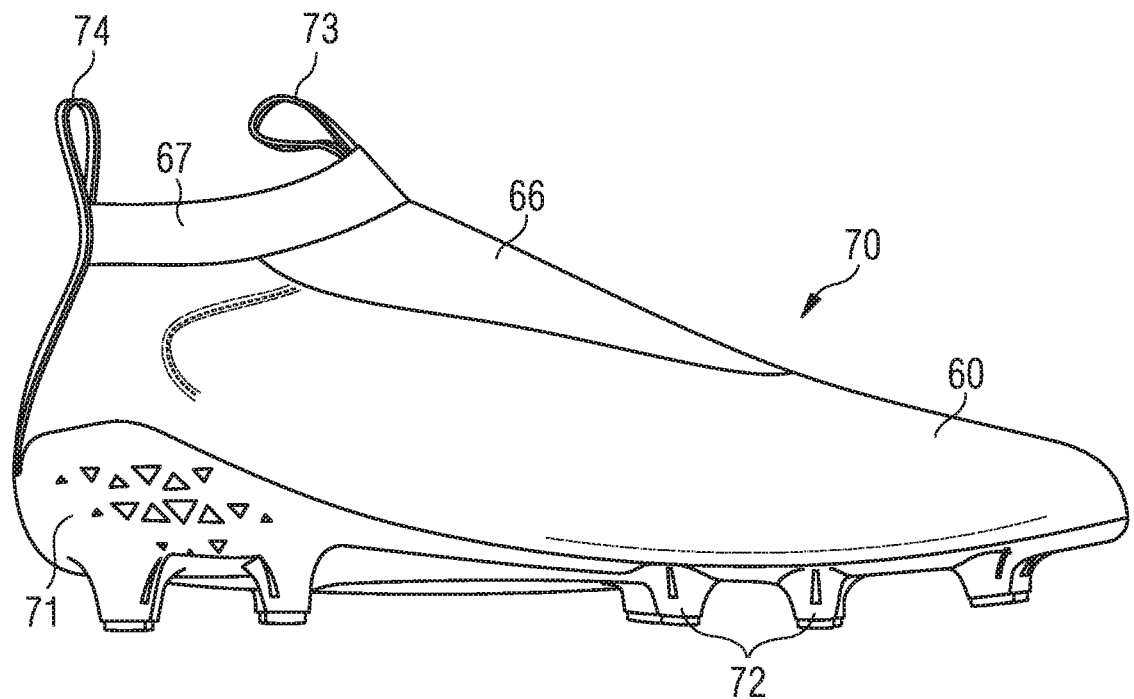
FIG. 7B is a medial view of a shoe, according to certain embodiments of the present invention.

FIGS. 7A and 7B show a further example of a shoe 70 according to some embodiments. FIG. 7A shows a lateral view of the shoe 70, whereas FIG. 7B shows a medial view of the shoe 70. The shoe 70 comprises a shoe upper comprising a layer similar to the layer of a shoe upper 60 as described above with respect to FIGS. 6A and 6B. In addition, the shoe 70 comprises a sole 71 which is joined to the shoe upper 60. The sole 71 may be joined to the shoe upper 10 for example by stitching, gluing or welding.

The sole 71 comprises cleats, two of which are denoted way of example by the reference numeral 72. Accordingly, FIGS. 7A and 7B show a soccer shoe. However, it should be noted, that the present invention may be applied to any kind of shoes, in particular any kind of athletic shoes. Examples include football shoes, rugby shoes, tennis shoes, basketball boots, etc.

As shown in FIGS. 7A and 7B, the shoe upper 60 comprises a support element 75 on the lateral side. This support element 75 adds stiffness to the lateral side of the upper, thereby making the lateral portion 63 of the upper stiffer than the medial portion 64 and the vamp portion 61.

The support element 75 is for example a thermoplastic material. Its thickness is for example between 0.1 mm and 3 mm, for example of about 1 mm. It may be bonded by heat on top of the coating.

Figure 9:
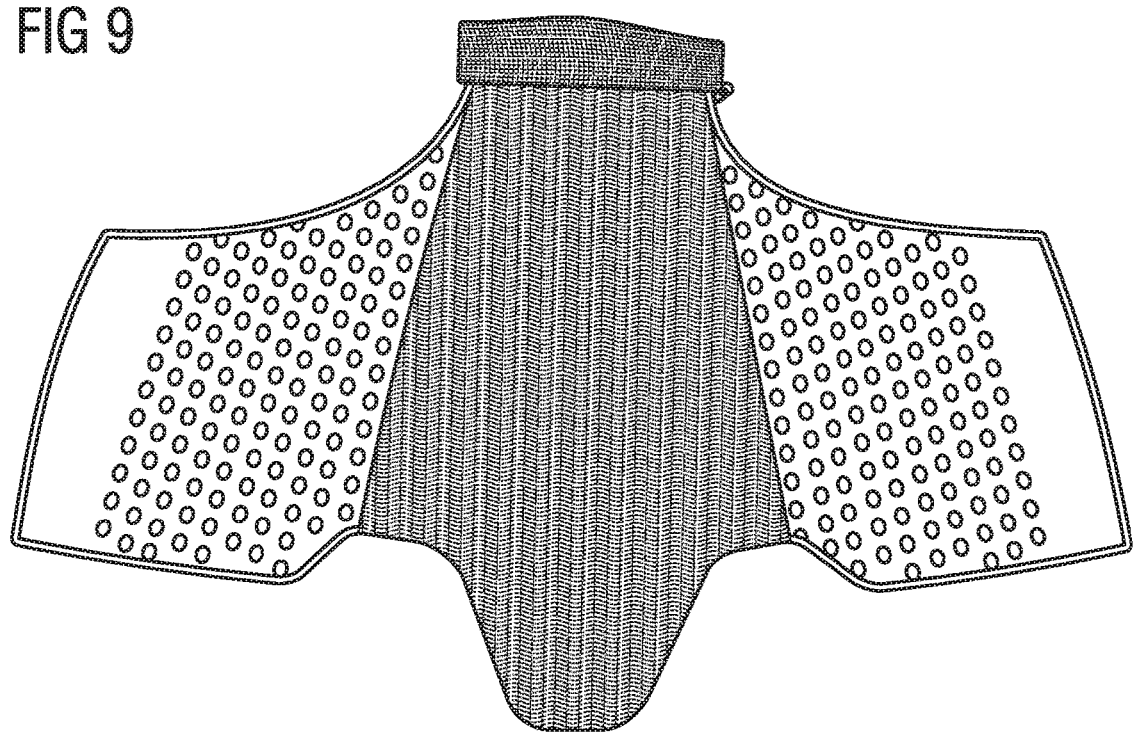
FIG. 9 shows a sock for a shoe upper, according to certain embodiments of the present invention.

As shown in FIGS. 7A and 7B, the shoe upper 60 may include a holding tab 73. The holding tab 73 is shown arranged proximate the junction between the elastic intermediate portion 66 and the collar portion 67 of the shoe upper 60. The holding tab 73 allows the U-throat to be held while inserting or extracting the foot into or out of the shoe 70. To this end, a first end of the holding tab 73 is attached to the shoe upper 60 at the top of the dorsal portion 65. A second end of the holding tab 73 is attached to a sock (not shown in FIGS. 7A and 7B) which is arranged inside the shoe upper 60. The sock is attached (e.g. by gluing, sewing or welding) to the shoe upper 60 at the collar portion 67 of the shoe upper 60. An example of a layer for a sock is shown in FIG. 9.

As shown in FIGS. 7A and 7B, the shoe upper 60 may include a holding tab 74 arranged in the heel portion of the shoe upper 60. The holding tab 74 facilitates putting on or taking off the shoe 70.

Measurements have been made on a shoe upper 60 on a shoe according to some embodiments. The following table shows the local maximum strain values of the shoe portions in the second to fifth columns during the movements listed in the first column:

TABLE 1

| activity | U-throat | medial portion | lateral portion | forefoot |
| --- | --- | --- | --- | --- |
| standing | 40% | 20% | 15% | 15% |
| straight sprinting | 15% | 10% | 10% | 15% |
| cutting movement | 20% | 10% | 10% | 10% |

The strain of the activity "straight sprinting" and of the activity "cutting movement" is the additional strain compared to the "standing" activity.

More particularly, the following local maximum strain values have been found when measuring a shoe upper 10 on a shoe according to the some embodiments:

TABLE 2

| activity | U-throat | medial side | lateral side | forefoot |
| --- | --- | --- | --- | --- |
| standing | 30% | 10% | 10% | 10% |
| straight sprinting | 10% | 5% | 5% | 10% |
| cutting movement | 15% | 5% | 5% | 5% |

FIGS. 8A and 8B show stress-strain-diagrams which have been obtained by measuring different areas of a shoe some embodiments. The measurements have been taken during the third elongation and recovery cycle with a strain of 0% to 30% of samples of 20 mm wide and 50 mm long from clamp to clamp. The ordinate axis represents load values in Newtons; the abscissa axis represents the strain in millimeters. Thereby an abscissa of for example 15 mm is representative of a 30% strain (using samples being 50 mm long from clamp to clamp).

Some examples of values of load (in Newtons) applied to elongate (in percentage of original length) different portions of the shoe at different strain level during elongation are displayed below in table 3, corresponding to FIG. 8A.

TABLE 3

| | U-throat | Toe | Medial and vamp | Lateral |
| --- | --- | --- | --- | --- |
| 10% | 3 N | 9 N | 13 N | 35 N |
| 15% | 5 N | 19 N | 26 N | 70 N |
| 20% | 7 N | 33 N | 44 N | 109 N |
| 25% | 9 N | 52 N | 72 N | 157 N |
| 30% | 11 N | 81 N | 118 N | 221 N |

As may be seen in both diagrams, the stress needed for a similar strain is significantly higher in the lateral portion than in the U-throat portion. While the shoe which was used for the measurement shown in FIG. 8A has a stiffer lateral and vamp portion than the toe portion, this is reversed in the shoe which was used for the measurement shown in FIG. 8B.

As may be seen in both diagrams, at a same stress level on different portions of the shoe upper, the strain is significantly higher in the U-throat portion than in the lateral and medial portions. For example a horizontal line has been drawn on FIG. 8A and FIG. 8B for the load applied to the U-throat to obtain a strain of 30%.

For this load (15.8 N) the values of strain of the other portions of the shoe upper have been measured and reported in the below table 4.

TABLE 4

| | Load applied | U-throat | Medial and vamp | Lateral |
| --- | --- | --- | --- | --- |
| Shoe upper of FIG. 8A | 15.8 N | 30.0% | 13.9% | 7.5% |
| Shoe upper of FIG. 8B | 11.0 N | 30.0% | 9.0% | 6.5% |

Therefore, for a certain load applied to the shoe upper, the medial and lateral portion will strain much less than the U-throat. During athletic activities, and more particularly cutting-movements the load is mainly applied to the lateral portion of the shoe. The deformation of the shoe during such activities is minimal. On the other hand, when putting the shoe on or off, a high load is applied by the wearer on the dorsal portion of the shoe where the U-throat is situated so as to stretch and facilitate insertion and extraction of the foot in and out of the shoe.

These measurements confirm the results obtained as regards stretch of different portions of the shoe upper measured on shoes during athletic activities (cf. Tables 1 and 2).

While the shoe which was used for the measurement shown in FIG. 8A has a stiffer medial and vamp portion than the toe portion, this is reversed in the shoe which was used for the measurement shown in FIG. 8B.

The shoe upper may also comprise additional layers on its outer surface, like the support element 75, or on its inner surface. In particular, additional layers may be used for padding some areas, for containing the padding, and/or for adding stiffness to some areas, and/or for adding protection to some areas. For example at least one layer may be added on the inner side of at least part of the lateral portion to increase its stiffness. Similarly, at least one layer may be added on the inner surface of at least part of the medial portion to increase its stiffness. Such layer may be made of a different material than the other layers, in particular of a different material than a one-piece knit layer. The different layers may be glued and/or stitched together. Also at least one layer may be added to ensure protection of some areas such as a heel counter to provide stiffness and protection of the heel, a toe box to protect the tip of the foot, etc.

Figure 10:
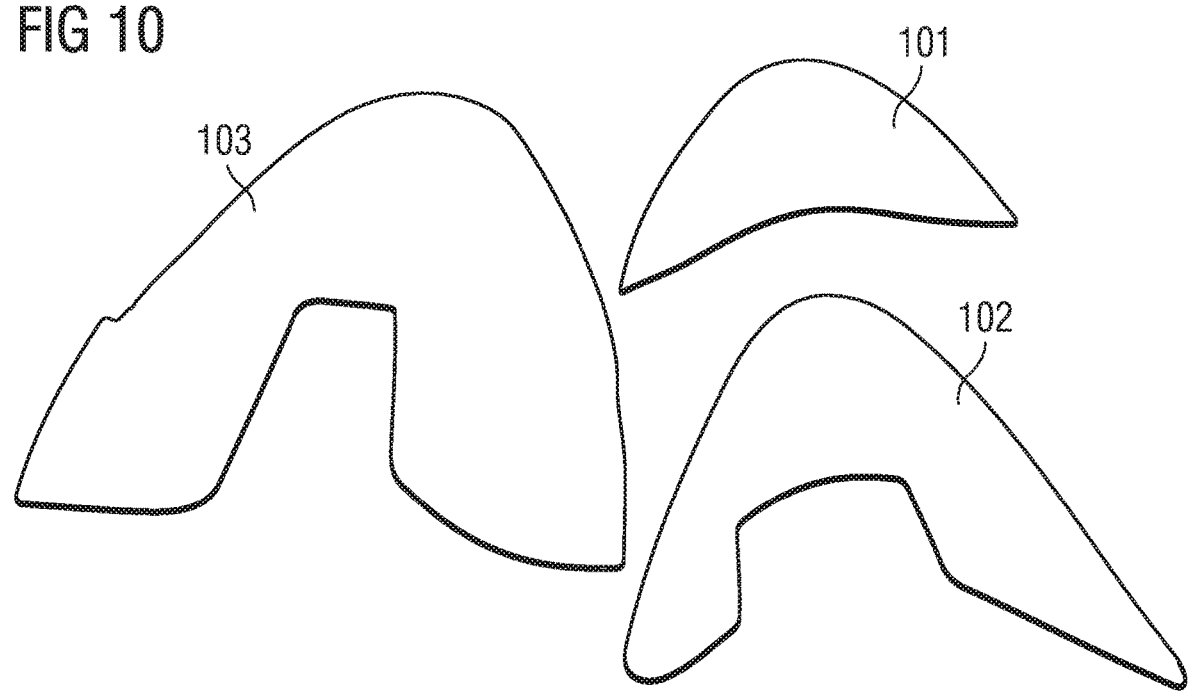
FIG. 10 illustrates internal layers of a forefoot portion of a shoe upper, according to certain embodiments of the present invention.

For example, in FIG. 10 internal layers of a forefoot portion are represented. In order from the base layer to the internal space of the shoe, there is a toe box 101, a toe padding and a lining. These elements are attached to the base layer, for example by gluing and/or stitching.

The toe box 101 is represented at the top right side of FIG. 10. The toe box 101 is made to reinforce the tip of the shoe upper so as to better protect the foot from impacts. The toe box may also in some embodiments stiffen this portion of the shoe upper.

The toe padding 102 is a piece of foamed material and is represented at the bottom right side of FIG. 10. The toe padding 102 is adapted to protect the foot from impacts.

On the left side of FIG. 10 an internal lining 103 is represented. The internal lining 103 is made to contain the toe padding 102 and protect the toe padding 102 from friction with the foot, as well as to improve the comfort of the wearer. The internal lining 103 may in some embodiments stiffen this portion of the shoe upper.

Figure 11:
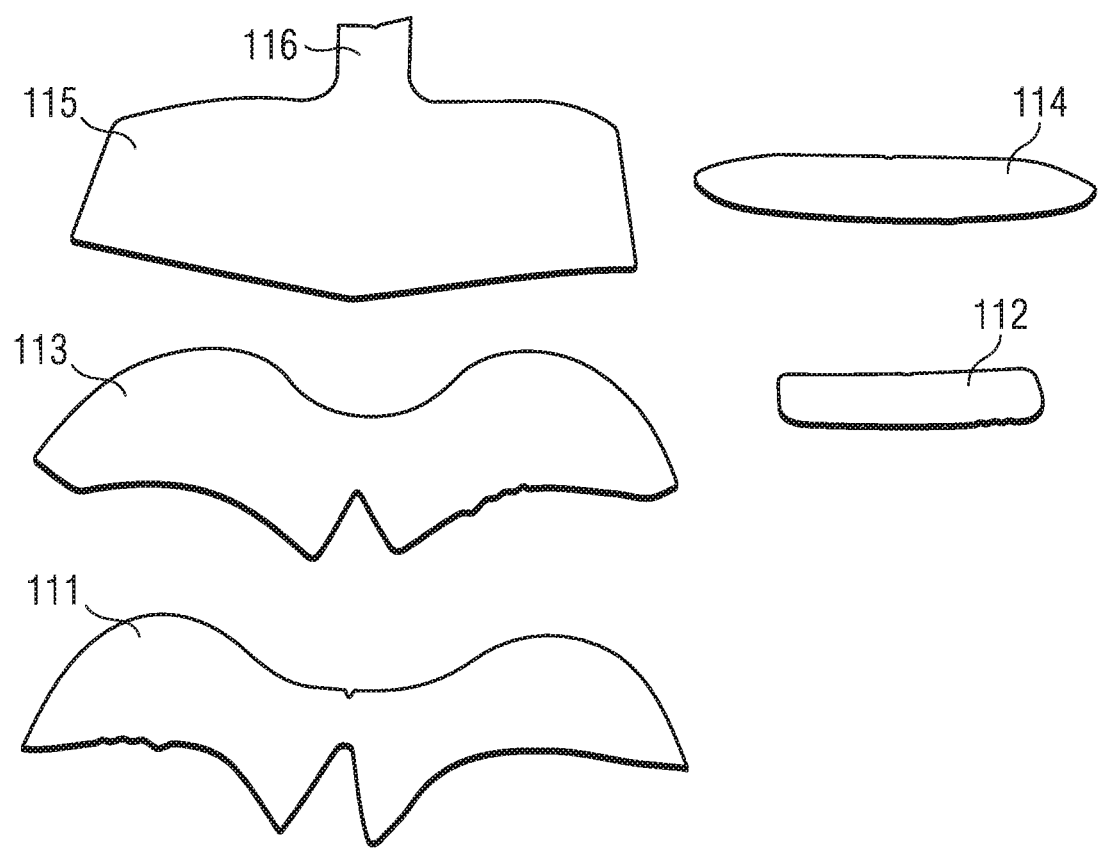
FIG. 11 illustrates internal layers of a heel portion of a shoe upper, according to certain embodiments of the present invention.

In FIG. 11 internal layers of a heel portion are represented. In order from the base layer to the internal space of the shoe, there is a hot melt layer 111, a first heel padding 112, a heel envelope 113, a second heel padding 114 and an internal lining 115.

The hot melt layer 111 is represented at the bottom left of FIG. 11. The hot melt layer 111 is adapted to attach the first heel padding 112 and the heel envelope 113 to the base layer of the shoe upper. The hot melt layer 111 may in some embodiments stiffen this portion of the shoe upper. Thus, the hot melt layer 111 may act as a heel counter.

The first heel padding 112 is a piece of foamed material and is represented on the right side of FIG. 11 below the second heel padding 114. The heel padding 112 is arranged between the hot melt layer 111 and the heel envelope 113. The heel paddings 112 and 114 are adapted to protect the foot from impacts.

The heel envelope 113 is represented in the middle part of the left side of FIG. 11. The heel envelope 113 protects the heel paddings 112 and 114 from friction with the foot. The heel envelope 113 may in some embodiments stiffen this portion of the shoe upper. In particular, the heel envelope 113 may reinforce the hot melt layer 111.

The second heel padding 114 is a piece of foamed material and is represented on the right side of FIG. 11 above the first heel padding 112. The heel padding 114 is arranged between the heel envelope 113 and the internal lining 115. The heel paddings 112 and 114 are adapted to protect the foot from impacts.

On the top left side of FIG. 11 an internal lining 115 is represented. The internal lining 115 is made to contain the heel paddings 112, 114 and the heel envelope 113 and to improve the comfort of the wearer. The internal lining 115 also comprises a tongue 116 adapted to be attached, e.g. stitched, with the holding tab 24. The internal lining 115 is also in some embodiments stitched to an internal sock (such as for example the sock shown in FIG. 9). The internal lining 115 is in some embodiments glued and/or stitched to the base layer. The internal lining 115 may in some embodiments stiffen this portion of the shoe upper.

In the following, further examples are described to facilitate the understanding of the invention:

1. Method of manufacturing an article comprising a fabric (10), wherein the method comprises at least the steps of:
   providing a fabric (10) comprising a first surface and a second surface opposite the first surface;
   placing the fabric (10) on a surface of a support structure (11), wherein the support structure (11) is adapted to permit gas circulation through at least a portion of its surface (12) and comprises at least a raised or embossed portion (13) on its surface (12), and wherein the fabric (10) is placed such that the first surface of the fabric (10) faces the surface (12) of the support structure (11) and such that the fabric (10) is arranged at least in part over the raised or embossed portion (13) of the support structure (11);
   providing at least one coating (14) comprising a first surface and a second surface opposite the first surface;
   placing the coating (14) at least partially on the second surface of the fabric (10), such that the first surface of the coating (13) faces the fabric (10); and
   applying a gas pressure differential between the second surface of the coating (14) and the first surface of the fabric (10).
2. Method according to the preceding example, wherein the article is a shoe upper for a shoe, or wherein the article is a shoe.
3. Method according to one of the preceding examples, wherein the fabric is a knitted fabric.
4. Method according to the preceding example, further comprising the step of placing a draping membrane on the fabric and the coating before the pressure differential is applied.
5. Method according to one of the preceding examples, further comprising the step of heating the coating.
6. Method according to the preceding example, wherein the step of heating the coating is performed at least partly simultaneously with the step of applying a gas pressure differential.
7. Method according to one of the preceding examples, wherein the coating is a film.
8. Method according to the preceding example, wherein the coating has a thickness between 0.02 mm and 3 mm.
9. Method according to one of the preceding examples, wherein the coating is a thermoplastic coating.
10. Method according to one of the preceding examples, wherein the coating is a polymer with a hardness in the range of 40-80 Shore A.
11. Method according to one of the preceding examples, wherein the step of providing at least one coating comprises providing a plurality of coatings and the steps of placing the coating comprises placing the plurality of coatings.
12. Method according to one of the preceding examples, wherein the raised or embossed portion of the support structure corresponds to an ankle portion and a top portion of a dorsal part of a last.
13. Method according to one of the preceding examples, wherein the support structure has the shape of a shoe last.
14. Article (40, 50) comprising a fabric obtained by a method according to one of the preceding examples.
15. Article according to the preceding examples, wherein the fabric has a three-dimensional shape.
16. Article according to one of examples 14 or 15, wherein the article is a shoe in which the fabric forms at least a part of the shoe upper, or wherein the article is a shoe upper for a shoe.
17. Article according to example 16, wherein the shoe is a laceless shoe.
18. Article according to one of examples 16 or 17, wherein the shoe upper is knitted in one piece.
19. Article according to one of examples 16 to 18, wherein the shoe upper is laceless and comprises:
    a. a lateral portion;
    b. a medial portion; and
    c. at least an elastic intermediate portion between the lateral portion and the medial portion, wherein the stiffness of at least one of the lateral portion and the medial portion is at least 2 times higher than the stiffness of the elastic intermediate portion.
20. Article according to example 19, wherein the elastic intermediate portion is placed at least in part over the raised or embossed portion of the support structure.
21. Article according to one of examples 19 or 20, wherein the lateral portion is adapted to extend from a lateral junction of the upper with the sole to the elastic intermediate portion.
22. Article according to one of examples 19 to 21, wherein the medial portion is adapted to extend from a medial junction of the upper with the sole to the elastic intermediate portion.

23. Article according to one of examples 19 to 22, wherein the shoe upper comprises a unique elastic intermediate portion between the lateral portion and the medial portion.
24. Article according to one of examples 19 to 23, wherein the stiffness of the medial portion is between 2 and 30 times higher than the stiffness of the intermediate portion.
25. Article according to one of examples 19 to 24, wherein the stiffness of the lateral portion is between 3 and 50 times higher than the stiffness of the intermediate portion.
26. Article according to one of examples 19 to 25, wherein the shoe upper comprises at least one forefoot portion with a stiffness at least equal to the stiffness of the medial portion.
27. Article according to one examples 19 to 25, wherein the shoe upper comprises one or more coatings applied essentially to an entire base layer of the shoe upper except in the elastic intermediate portion.
28. Article according to one of examples 14 or 15, wherein the article is a piece of apparel.
29. Article according to one of examples 14 or 15, wherein the article is a wearable accessory.
30. Device for manufacturing an article comprising a fabric (10), wherein the device comprises:
    a. a support structure (11), wherein the support structure (11) is adapted to permit gas circulation through at least a portion of its surface (12) and comprises at least a raised or embossed portion (13) on its surface (12), and wherein the support structure (11) is adapted to hold a fabric (10) and a coating (14) such that at least a portion of the fabric (10) is arranged over the raised or embossed portion (13); and
    b. a vacuum source connected to the support structure (11) adapted for applying a gas pressure differential between two opposite faces of the fabric (10) placed on the surface (12) of the support structure (11).
31. Device according to the preceding example, further comprising a draping membrane adapted to be placed on the fabric and the coating.
32. Device according to one of examples 30 or 31, wherein the device is adapted to perform a method according to one of examples 1 to 13.
33. Device according to one of examples 30 to 32, wherein the device is adapted to manufacture an article according to one of examples 14 to 20.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of manufacturing an article comprising a fabric, the method comprising:
    providing a fabric comprising a first surface and a second surface opposite the first surface;
    providing a support structure having a surface, the support structure being adapted to permit gas circulation through at least a portion of the surface of the support structure, the support structure comprising at least a raised or embossed portion on the surface of the support structure;
    placing the fabric on the surface of the support structure such that the first surface of the fabric faces the surface of the support structure and such that the fabric is arranged at least in part over the raised or embossed portion of the support structure;
    providing a coating set comprising at least one coating separate from the fabric, wherein the coating set further comprises a first coating surface and a second coating surface opposite the first coating surface;
    placing the coating set at least partially on the second surface of the fabric after the fabric is placed on the surface of the support structure and such that the first coating surface faces the fabric, wherein the coating set is placed on the fabric such that an uncoated portion of the fabric not coated by the coating set is defined, and wherein the fabric and coating set are placed such that the uncoated portion of the fabric is arranged at least in part over the raised or embossed portion of the support structure;
    placing a shell over at least a part of the uncoated portion of the fabric;
    heating the coating set from above the coating set, wherein the shell shields at least some of the uncoated portion of the fabric from said heating; and
    applying a gas pressure differential between the second coating surface and the first surface of the fabric.

2. The method of claim 1, wherein the article is a shoe upper for a shoe, or wherein the article is the shoe comprising the shoe upper.

3. The method of claim 1, wherein the fabric is a knitted fabric.

4. The method of claim 1, further comprising placing a draping membrane on the fabric and the coating set before the pressure differential is applied.

5. The method of claim 1, wherein the heating the coating set is performed at least partly simultaneously with the applying the gas pressure differential.

6. The method of claim 1, wherein the coating set comprises a film that has a thickness between 0.02 mm and 3 mm.

7. The method of claim 1, wherein the coating set comprises a thermoplastic coating.

8. The method of claim 1, wherein the coating set comprises a polymer with a hardness in the range of 40-80 Shore A.

9. The method of claim 1, wherein providing the coating set comprises providing a plurality of coatings, and placing the coating set comprises placing the plurality of coatings.

10. The method of claim 1, wherein the raised or embossed portion of the support structure corresponds to an ankle portion and a top portion of a dorsal part of a last.

11. The method of claim 1, wherein the support structure has the shape of a shoe last.

12. The method of claim 1, wherein the coating set is bonded to the fabric at least in part by the gas pressure differential being applied between the second coating surface and the first surface of the fabric.

13. A method of manufacturing an article comprising a fabric, the method comprising:
    providing a fabric comprising a first surface and a second surface opposite the first surface;

providing a coating set comprising at least one coating, wherein the coating set further comprises a first coating surface and a second coating surface opposite the first coating surface;

providing a support structure having a surface, the support structure being adapted to permit gas circulation through at least a portion of the surface of the support structure, the support structure comprising at least a raised or embossed portion on the surface of the support structure;

placing the fabric and the coating set such that the fabric is on the surface of the support structure, such that the first surface of the fabric faces the surface of the support structure, such that the coating set is at least partially on the second surface of the fabric, such that the first coating surface faces the fabric, and such that an uncoated portion of the fabric not coated by the at least one coating is arranged at least in part over the raised or embossed portion of the support structure;

placing a shell over at least a part of the uncoated portion of the fabric;

heating the coating set from above the coating set, wherein the shell shields at least some of the uncoated portion of the fabric from said heating; and applying a gas pressure differential between the second coating surface and the first surface of the fabric.

14. The method of claim 13, wherein the article is a shoe upper for a shoe, or wherein the article is the shoe comprising the shoe upper.

15. The method of claim 13, wherein the fabric is a knitted fabric.

16. The method of claim 13, wherein the heating the coating set is performed at least partly simultaneously with the applying the gas pressure differential.

17. The method of claim 13, wherein providing one the coating set comprises providing a plurality of coatings, and placing the coating set comprises placing the plurality of coatings.

18. A method of manufacturing an article comprising a fabric, the method comprising:

providing a fabric comprising a first surface and a second surface opposite the first surface;

providing a support structure having a surface, the support structure being adapted to permit gas circulation through at least a portion of the surface of the support structure, the support structure comprising at least a raised or embossed portion on the surface of the support structure;

placing the fabric on the surface of the support structure such that the first surface of the fabric faces the surface of the support structure and such that the fabric is arranged at least in part over the raised or embossed portion of the support structure;

providing a coating set comprising at least one coating, wherein the coating set further comprises a first coating surface and a second coating surface opposite the first coating surface;

placing the coating set at least partially on the second surface of the fabric, such that the first coating surface faces the fabric, wherein the coating set is placed on the fabric such that an uncoated portion of the fabric not coated by the at least one coating is defined, and wherein the fabric and coating set are placed such that the uncoated portion of the fabric is arranged at least in part over the raised or embossed portion of the support structure;

placing a shell over at least a part of the uncoated portion of the fabric;

heating the coating set from above the coating set, wherein the shell shields at least some of the uncoated portion of the fabric from said heating; and bonding the coating set to the fabric at least by applying a gas pressure differential between the second coating surface and the first surface of the fabric.

19. The method of claim 18, wherein a pre-formed shape of the article is imparted at least in part by the gas pressure differential being applied between the second coating surface and the first surface of the fabric.

20. The method of claim 19, wherein the pre-formed shape is imparted in a portion of the fabric not coated by the coating set.

* * * * *